United States Patent
Cook et al.

(10) Patent No.: US 11,188,341 B2
(45) Date of Patent: Nov. 30, 2021

(54) SYSTEM, APPARATUS AND METHOD FOR SYMBOLIC STORE ADDRESS GENERATION FOR DATA-PARALLEL PROCESSOR

(71) Applicant: Intel Corporation, Santa Clara, CA (US)

(72) Inventors: Jeffrey J. Cook, Portland, OR (US); Srikanth T. Srinivasan, Portland, OR (US); Jonathan D. Pearce, Hillsboro, OR (US); David B. Sheffield, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 16/364,704

(22) Filed: Mar. 26, 2019

(65) Prior Publication Data

US 2020/0310817 A1 Oct. 1, 2020

(51) Int. Cl.
*G06F 9/30* (2018.01)
*G06F 9/38* (2018.01)
*G06F 9/48* (2006.01)
*G06F 9/54* (2006.01)

(52) U.S. Cl.
CPC ........ *G06F 9/3842* (2013.01); *G06F 9/30043* (2013.01); *G06F 9/4881* (2013.01); *G06F 9/544* (2013.01); *G06F 9/384* (2013.01)

(58) Field of Classification Search
CPC .... G06F 9/3824; G06F 9/3842; G06F 9/3834; G06F 9/3887; G06F 9/30043; G06F 9/544; G06F 9/3555; G06F 9/3851; G06F 9/4881

USPC .......................................................... 712/216
See application file for complete search history.

(56) References Cited

U.S. PATENT DOCUMENTS

| | | | |
|---|---|---|---|
| 5,193,166 A | 3/1993 | Menasce | |
| 5,630,157 A * | 5/1997 | Dwyer, III | G06F 9/30072 712/214 |
| 5,717,882 A | 2/1998 | Abramson et al. | |
| 5,826,052 A | 10/1998 | Stiles | |
| 6,128,704 A | 10/2000 | Jun | |
| 6,301,654 B1 * | 10/2001 | Ronchetti | G06F 9/30043 712/204 |
| 6,859,861 B1 | 2/2005 | Rhodes | |
| 7,904,905 B2 | 3/2011 | Cervini | |
| 10,007,521 B1 * | 6/2018 | Tam | G06F 9/384 |
| 2002/0188806 A1 | 12/2002 | Rakvic | |
| 2008/0209129 A1 | 8/2008 | Van De Waerdt | |

(Continued)

OTHER PUBLICATIONS

Honesty Cheng Yung, "Evaluation of a Decoupled Computer Architecture and the Design of a Vector Extension," Jul. 1985, 112 pages.

(Continued)

*Primary Examiner* — Chun Kuan Lee
(74) *Attorney, Agent, or Firm* — Trop Pruner & Hu, P.C.

(57) ABSTRACT

In one embodiment, an apparatus includes: a plurality of execution lanes to perform parallel execution of instructions; and a unified symbolic store address buffer coupled to the plurality of execution lanes, the unified symbolic store address buffer comprising a plurality of entries each to store a symbolic store address for a store instruction to be executed by at least some of the plurality of execution lanes. Other embodiments are described and claimed.

14 Claims, 19 Drawing Sheets

(56) References Cited

U.S. PATENT DOCUMENTS

| | | | |
|---|---|---|---|
| 2008/0222387 A1 | 9/2008 | Williamson | |
| 2009/0240930 A1* | 9/2009 | Barsness | G06F 9/4405 |
| | | | 712/229 |
| 2013/0046922 A1 | 2/2013 | Pan | |
| 2016/0147669 A1 | 5/2016 | Huang | |
| 2017/0351610 A1 | 12/2017 | Tran | |
| 2018/0188997 A1* | 7/2018 | Fleming, Jr. | G06F 3/0685 |
| 2018/0189179 A1 | 7/2018 | Li | |
| 2019/0042269 A1 | 2/2019 | Pearce et al. | |
| 2020/0264882 A1* | 8/2020 | Cuffney | G06F 9/3867 |
| 2020/0272597 A1* | 8/2020 | Kesiraju | G06F 9/3867 |

OTHER PUBLICATIONS

Honesty C. Yung, et al. "The Design of a Queue-Based Vector Supercomputer," 1986, 4 pages.

U.S. Appl. No. 16/364,688, filed Mar. 26, 2019, entitled "System, Apparatus and Method for Program Order Queue (POQ) to Manage Data Dependencies in Processor Having Multiple Instruction Queues" by Andrey Ayupov, et al.

U.S. Appl. No. 16/364,725, filed Mar. 26, 2019, entitled "Gather-Scatter Cache Architecture for Single Program Multiple Data (SPMD) Processor" by Jeffrey J. Cook, et al.

U.S. Appl. No. 16/147,696, filed Sep. 29, 2018, entitled "Apparatus and Method for Adaptable and Efficient Lane-Wise Tensor Processing," by Jonathan Pearce, et al.

U.S. Appl. No. 16/220,528, filed Dec. 14, 2018, entitled "Appartus and Method for a High Throughput Parallel Co-Processor and Interconnect With Low Offload Latency," by Jonathan Pearce, et al.

U.S. Appl. No. 16/147,692, filed Sep. 29, 2018, entitled "Architecture and Method for Data Parallel Single Program Multiple Data (SPMD) Execution," by Jonathan Pearce, et al.

European Patent Office, European Search Report dated Aug. 18, 2020 in European patent application No. 20 15 3504 4, 12 pages total.

Sam S. Stone, et al., "Address-Indexed Memory Disambiguation and Store-To-Load Forwarding," Nov. 12, 2015, 12 pages total.

Jie S. Hu, et al., "Exploring Wakeup-Free Instruction Scheduling," Feb. 14, 2004, 10 pages total.

Erika Gunadi, et al., "CRIB: Consolidated Rename, Issue and Bypass," Jun. 4, 2011, 10 pages total.

European Patent Office, Office Action dated Jun. 22, 2021 in European Patent Application No. 20153504.4 (7 pages).

* cited by examiner

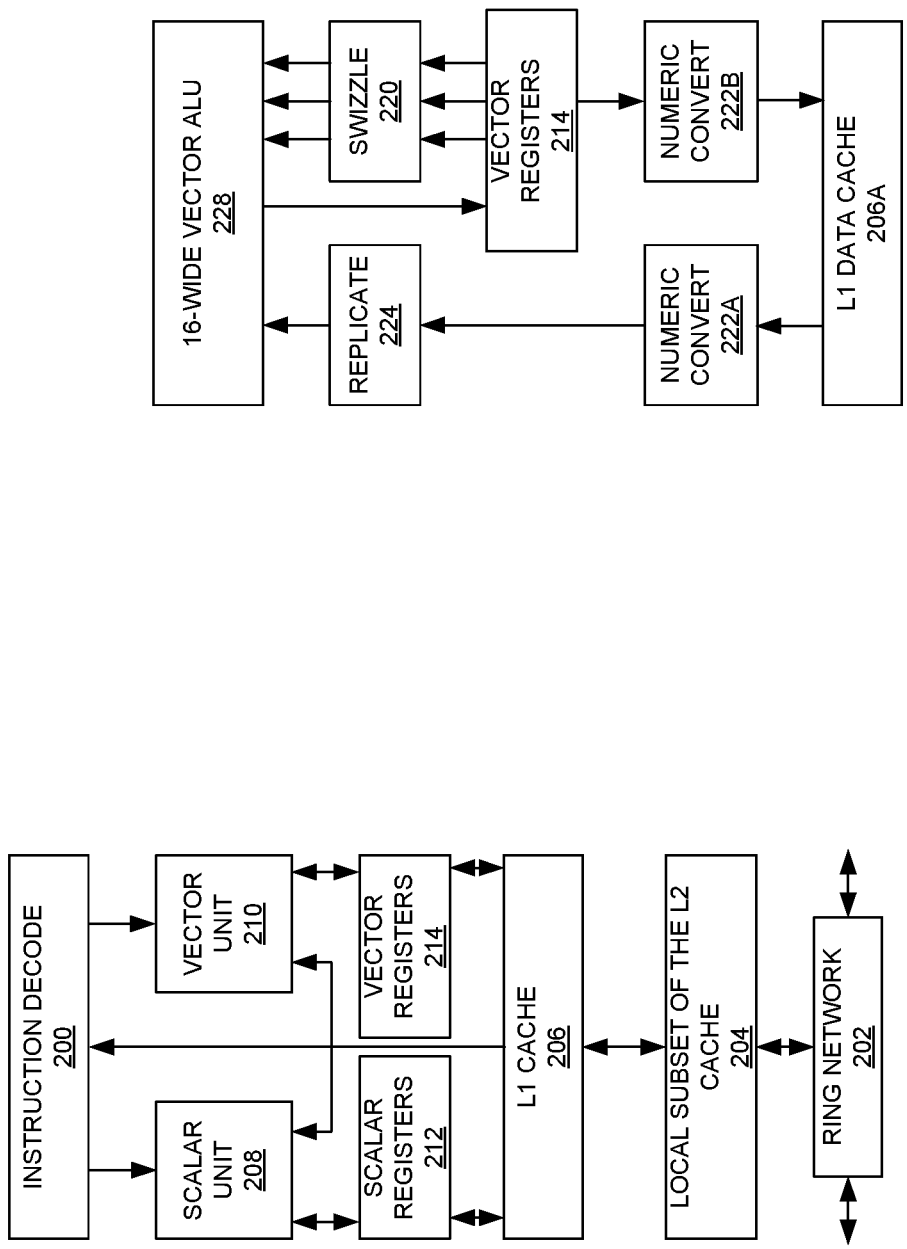

SYSTEM, APPARATUS AND METHOD FOR SYMBOLIC STORE ADDRESS GENERATION FOR DATA-PARALLEL PROCESSOR

TECHNICAL FIELD

Embodiments relate to processor architectures for handling store operations.

BACKGROUND

Data parallel single program multiple data (SPMD) processors coordinate many execution lanes as a group to amortize control logic and state for density and energy efficiency. In non-blocking (on stores) processor microarchitectures, stores are broken into two operations: (1) a store address calculation operation (STA) that logically enforces program order with respect to other loads and stores (for self-consistency); and (2) a senior store data operation (STD) that occurs at instruction retirement to store the data into memory. However, this approach requires generation of a store address per lane at STA dispatch. This store address is then stored in a per lane store address buffer to be checked by subsequent loads with per lane content addressable memory logic to check for memory ordering conflicts, which operates until the STD operation dispatches and completes many cycles later. As such, there is considerable chip real estate and power consumption expense for such processors.

BRIEF DESCRIPTION OF THE DRAWINGS

FIGS. 2A-B illustrate a block diagram of a more specific exemplary in-order core architecture in accordance with an embodiment of the present invention.

DETAILED DESCRIPTION

Figure 1A:
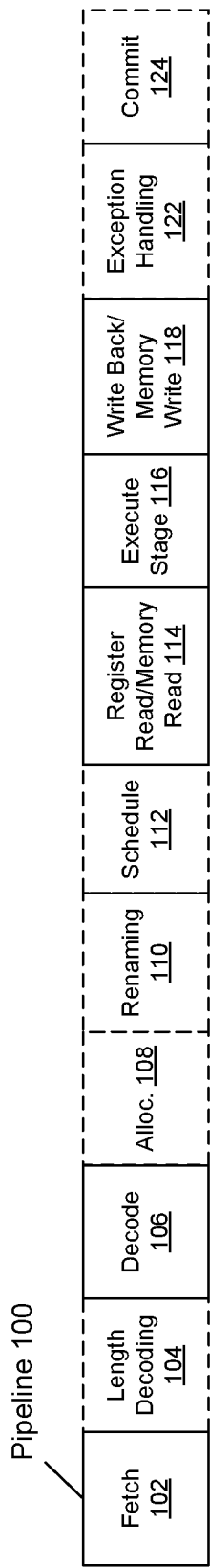
FIG. 1A is a block diagram illustrating both an exemplary in-order pipeline and an exemplary register renaming, out-of-order issue/execution pipeline according to embodiments of the invention.

In various embodiments, a processor having a single program multiple data architecture may be configured to generate symbolic addresses for store operations that leverage use of a single unified symbolic store address buffer to store information regarding these store operations, to reduce area and power consumption costs. In addition, using embodiments herein, techniques are provided to enable more rapid dispatch of load instructions following such store instructions in program order, referred to herein as younger instructions. In this way, embodiments enable speculative dispatch and execution of load instructions in a manner that improves latency and reduces power consumption.

In a particular implementation, a processor architecture is provided that includes various front end circuitry configured to operate on individual instructions and a plurality of execution lanes including execution units, each of which is configured to perform operations for these instructions on a per lane basis. Note that herein, the terms "operations" and "instructions" are used interchangeably. Furthermore, while particular techniques for handling store operations using symbolic address generation are described in the context of store instructions (and dependent load instructions), understand that in at least certain architectures, user-level store and load instructions may be decoded into one or more micro-instructions (uops) that are machine-level instructions actually executed in execution units. For ease of generality, the terms "operations," "instructions," and "uops" are used interchangeably.

With a SPMD processor, execution of the same program is enabled across multiple execution lanes, in which the same instruction is dispatched across the lanes in a single program multiple data model. In an implementation, multiple instruction queues may be provided, where memory instructions are stored in a first instruction queue and arithmetic-based instructions (referred to herein as ALU instructions) are stored in a second instruction queue. Memory instructions are initially dispatched from these instruction queues to parallel execution pipelines in-order.

At store address dispatch (STA) of a store instruction, a single symbolic address is generated and placed in a unified symbolic store address buffer, avoiding per lane store address buffer (SAB) storage and avoiding per lane SAB content addressable memory (CAM) logic. Future load instructions (namely load instructions following this store instruction in program order) symbolically access this symbolic store address buffer based on a generated symbolic load address for the load instruction (instead of a multiplicity of SABs across lanes) to speculatively (but with high confidence) detect self-consistency (intra-lane) memory ordering violations simultaneously for all lanes. In this regard, these future load instructions need not perform per execution lane checking of store addresses at this point of dispatch, reducing complexity, chip area and power consumption.

At store data dispatch (STD) at retirement of a store instruction, a per lane store address is computed. Using this per lane generated store address, access may be made to a per lane memory ordering queue (MOQ) that is populated by younger loads, to detect any mis-speculated younger loads. When such mis-speculated younger loads are identified, various operations are performed (e.g., including certain flush operations for a pipeline of a given execution lane). Thereafter, the store data of the store instruction is committed to the memory system. Note that the actual store of data for this STD operation may occur via an eager dispatch mechanism, where store data can be stored in a temporary buffer such as a store data buffer. Or the store of data may occur at retirement to avoid the expense of this extra buffer storage.

Using embodiments, cost-effective non-blocking store operation may be realized, to increase memory-level parallelism (MLP) by decreasing exposed cache latency of loads, and reducing area of lanes (no SAB per lane or SAB CAM logic per lane), and reducing power consumption. Still further, embodiments reduce scheduling logic critical path (e.g., no aggregation of SAB CAM comparisons across lanes). And, by eliminating per lane SAB state, additional lane thread context storage may be provided to hide other latencies such as cache misses. In embodiments, the area and energy cost of stores are amortized to achieve nearly constant area and constant energy invariant of the number of lanes being co-scheduled up until the point that a senior store is ready to retire and is dispatched to the cache subsystem.

In an embodiment, a SPMD processor architecture includes a plurality of execution lanes, each of which executes the same program. In this arrangement, a front end scheduler co-dispatches the same instruction across the lanes in a single program multiple data model. Memory instructions are initially dispatched in-order.

In an embodiment, when a store instruction is to be dispatched to the multiple execution lanes, a symbolic store address is generated in scheduling logic and stored, at store address dispatch (STA), in the unified symbolic store address buffer. Note that with an implementation, STA dispatch does not require the source address register operand values to be ready as they are only required at STD dispatch when the individual lane addresses are computed.

Referring now to Table 1, illustrated is an example of one possible symbolic store address formation, which when generated may be stored in a unified symbolic store address buffer entry. As shown in Table 1, only 47 bits are used for the symbolic address. Note that generation of a symbolic address may be realized by the concatenation of multiple fields of information, at least some of which may be obtained from the address fields portion of a given load or store instruction. More specifically, in one embodiment in accordance with Table 1 a symbolic address may be generated according to the following symbolic representation: Symbolic Address=Base Register+Index Register*Scale Factor+Displacement, where the operators are concatenation operators. Stated another way, the symbolic address generation results in a bit vector formed of those constituent fields. This resulting value thus corresponds to a beginning address of data to be accessed, where the data to be accessed has a width according to the Operand Size (where the operand size may be one, two, four or eight bytes wide).

TABLE 1

| Field Name | Size (bits) |
| --- | --- |
| DISPLACEMENT | 32 + 1 valid |
| BASE REGISTER | 4 + 1 valid |
| INDEX REGISTER | 4 + 1 valid |
| SCALE FACTOR | 2 |
| OPERAND SIZE | 2 |

This minimal storage of 47 bits contrasts with a requirement without an embodiment to store a non-symbolic entry in a per lane buffer. Assuming a 64-bit virtual address, this alternate arrangement with an embodiment would require 32 lanes×64-bit virtual address=2,048 bits of SAB storage.

Note that not all addressing modes may be supported by the symbolic store address entry. In this case, store instructions using addressing modes not represented by the chosen symbolic scheme are therefore considered blocking stores that stall younger loads issuing from that thread until both its source address operands and source data operands are ready, the instruction is ready to retire, and the store is senior.

After allocation of a store instruction to the execution lanes and inclusion of a symbolic store address into the unified symbolic store address buffer, younger load instructions may be speculatively dispatched, reducing latency. On dispatch of a younger load instruction, a symbolic load address may be generated and used to access the symbolic store address buffer to speculatively check for older in-flight conflicting stores. If a conflict is detected, the load instruction is suppressed until the conflicting store instruction has completed. Otherwise, if no conflict is detected, the load instruction is speculatively dispatched to the execution lanes. In the execution lanes, each lane operates to compute a per lane load address and perform the load operation from the memory system. In addition, the load address is written into a per lane memory ordering queue (MOQ). Note that this load address is a non-symbolic calculated address, rather than a symbolic address.

At store data dispatch (STD) at retirement, the store instruction then computes its address at each lane, accessing each lane's MOQ (e.g., via a CAM operation) populated by younger loads to detect any mis-speculated younger loads, and then commits the data to the memory system.

In an embodiment, the symbolic comparison between addresses may be performed as a CAM operation by logical concatenation of the bits that form the symbolic address buffer entry. This comparison will only identify a subset of true dependences through memory for operations of common size using the same addressing scheme with common base/index registers. It is possible that other true dependences will not be identified and cause a mis-speculation pipeline clear at senior store dispatch. However note that these mis-speculation events are uncommon in data-parallel kernels (in part due to limited speculation). Further, stalls due to false symbolic aliases are infrequent since short instruction count loops (where false aliases could be an issue) are unrolled to utilize register address space as accumulators, etc. Note that embodiments may control operation to not enable speculative load operations in certain cases (e.g., dynamically). For example, speculative load instruction dispatch may be prevented for stack pointer-based memory operations. In this conservative flow, loads that occur in program order after a stack pointer modification instruction (that would complicate or negate symbolic disambiguation) are not speculative dispatched.

In some embodiments, a more comprehensive symbolic address CAM comparison technique (resulting in less mis-speculation) may track the symbolic affine relationship between architectural registers, interpret the operand size field to compare operations of different size and/or alignment, interpret the scale factor field, etc. As this CAM is instantiated only once instead of once per lane (e.g., 32 lanes in an example architecture), there exists significant area/power budget for this complex comparison, yet retaining most of the savings of a baseline symbolic store address buffer.

Embodiments may further mitigate mis-speculation in antagonistic codes. For example, in data-parallel kernels where the symbolic comparison of younger loads to older stores mis-speculates at a high rate and thus hurts performance, the load speculation mechanism may be automatically temporarily disabled until kernel exit, region exit event, temporal density, etc. To this end, embodiments may leverage performance monitoring information, e.g., from one or more performance monitoring units of a processor that tracks a variety of performance monitoring information including information regarding a number of mis-speculation events, flushes or so forth. A selective mitigation scheme also may be employed to disable load speculation only for offending instruction addresses by use of mechanisms such as a Bloom filter for store or load instruction IPs and/or by marking in a front-end decoded uop stream buffer those load instructions in the current loop that should not speculate.

Figure 1B:
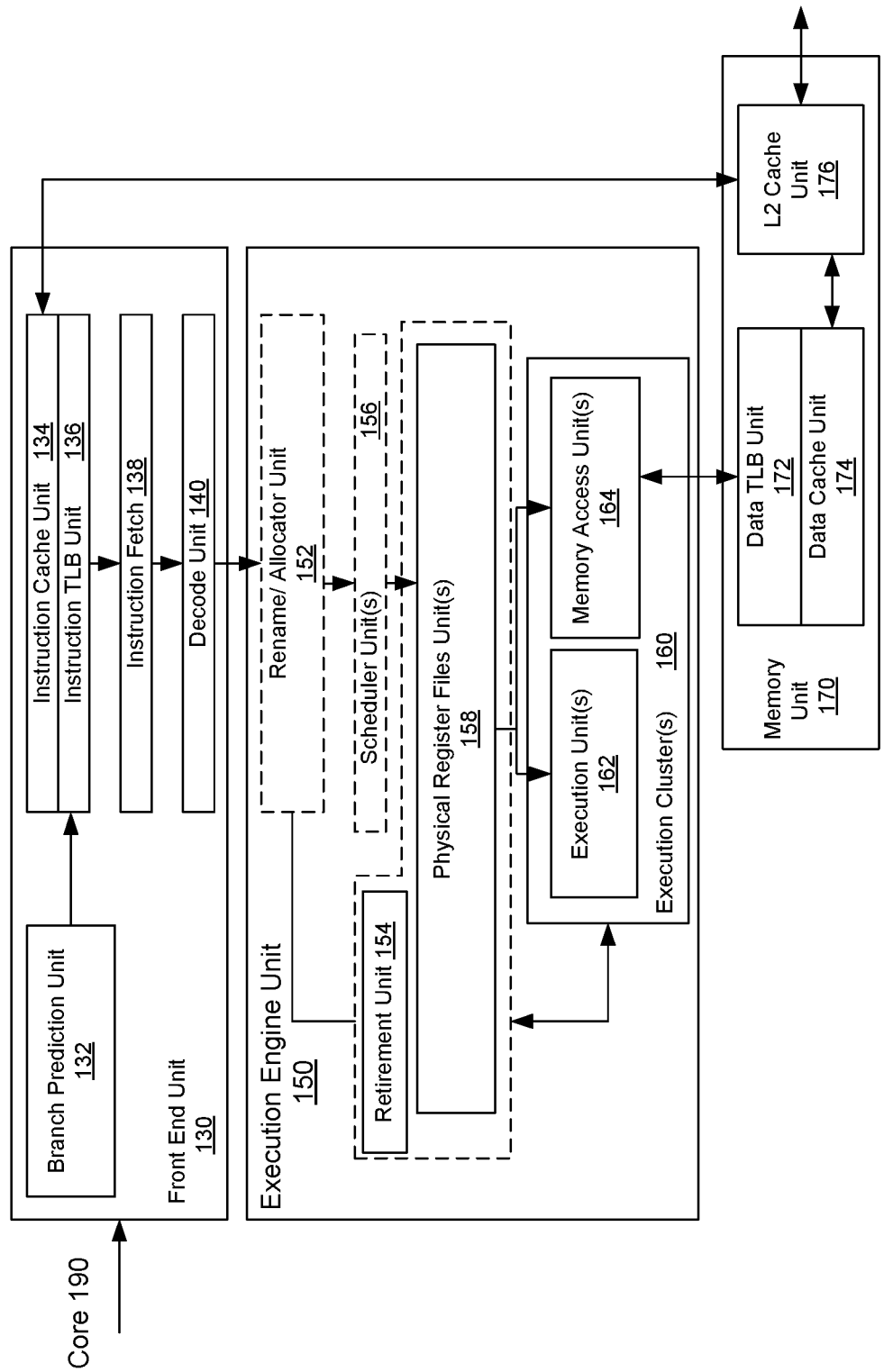
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 2A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor core, along with its connection to the on-die interconnect network 202 and with its local subset of the Level 2 (L2) cache 204, according to embodiments of the invention. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments of the invention may use a different approach (e.g., use a single register set or include a communication path that allow data to be transferred between the two register files without being written and read back).

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly, in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 2B is an expanded view of part of the processor core in FIG. 2A according to embodiments of the invention. FIG. 2B includes an L1 data cache 206A part of the L1 cache 204, as well as more detail regarding the vector unit 210 and the vector registers 214. Specifically, the vector unit 210 is a 6-wide vector processing unit (VPU) (see the 16-wide ALU 228), which executes one or more of integer, single-precision float, and double-precision float instructions. The VPU supports swizzling the register inputs with swizzle unit 220, numeric conversion with numeric convert units 222A-B, and replication with replication unit 224 on the memory input.

Figure 3:
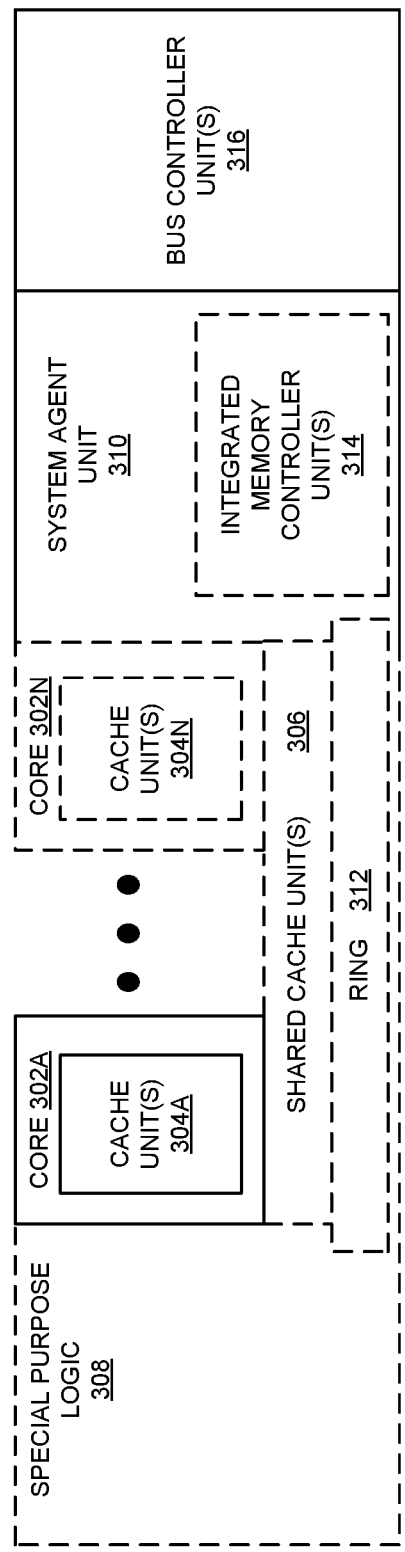
FIG. 3 is a block diagram of a processor that may have more than one core, may have an integrated memory controller, and may have integrated graphics according to embodiments of the invention.

FIG. 3 is a block diagram of a processor 300 that may have more than one core, may have an integrated memory controller, and may have integrated graphics according to embodiments of the invention. The solid lined boxes in FIG. 3 illustrate a processor 300 with a single core 302A, a system agent 310, a set of one or more bus controller units 316, while the optional addition of the dashed lined boxes illustrates an alternative processor 600 with multiple cores 302A-N, a set of one or more integrated memory controller unit(s) 314 in the system agent unit 310, and special purpose logic 308.

Thus, different implementations of the processor 300 may include: 1) a CPU with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); and 3) a coprocessor with the cores 302A-N being a large number of general purpose in-order cores. Thus, the processor 300 may be a general purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache within the cores 304A-N, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring based interconnect unit 312 interconnects the special purpose logic 308, the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N.

In some embodiments, one or more of the cores 302A-N are capable of multi-threading. The system agent 310 includes those components coordinating and operating cores 302A-N. The system agent unit 310 may include for example a power control unit (PCU) and a display unit. The PCU may be or include logic and components needed for regulating the power state of the cores 302A-N and the special purpose logic 308.

The cores 302A-N may be homogenous or heterogeneous in terms of architecture instruction set; that is, two or more of the cores 302A-N may be capable of execution the same instruction set, while others may be capable of executing only a subset of that instruction set or a different instruction set.

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
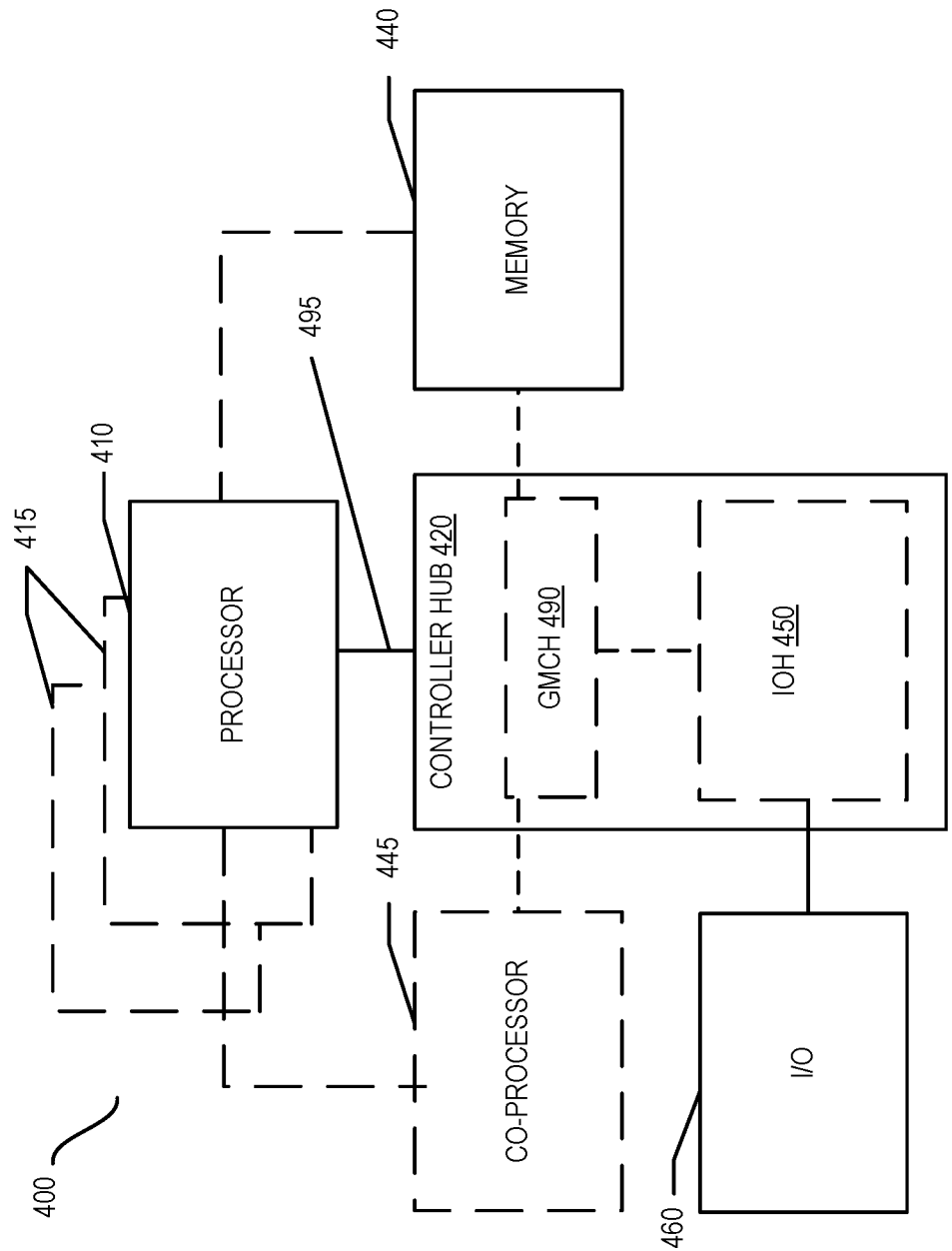
FIG. 4 is a block diagram of a system in accordance with one embodiment of the present invention.

Referring now to FIG. 4, shown is a block diagram of a system 400 in accordance with one embodiment of the present invention. The system 400 may include one or more processors 410, 415, which are coupled to a controller hub 420. In one embodiment, the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 is couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random access memory (DRAM), phase change memory (PCM), or a combination of the two. For at least one embodiment, the controller hub 420 communicates with the processor(s) 410, 415 via a multidrop bus, such as a frontside bus (FSB), point-to-point interface, or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
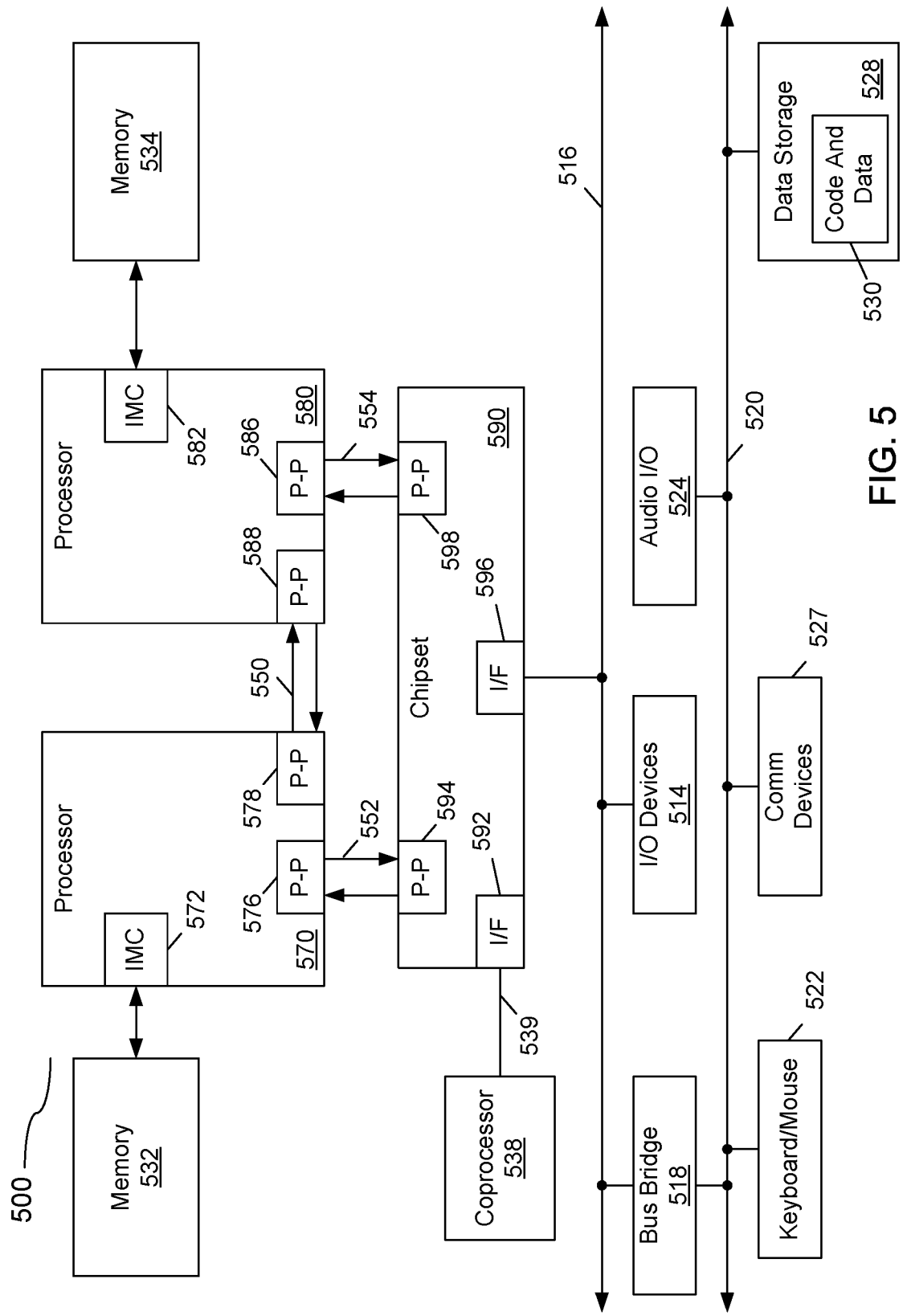
FIG. 5 is a block diagram of a first more specific exemplary system in accordance with an embodiment of the present invention.

Referring now to FIG. 5, shown is a block diagram of a first more specific exemplary system 500 in accordance with an embodiment of the present invention. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 and coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high performance interface 592. In one embodiment, the coprocessor 538 is a special-purpose processor, such as, for example, a high throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to the second bus 516. Note that other architectures are possible. For example, instead of the point-to-point architecture of FIG. 5, a system may implement a multi-drop bus or other such architecture.

Figure 6:
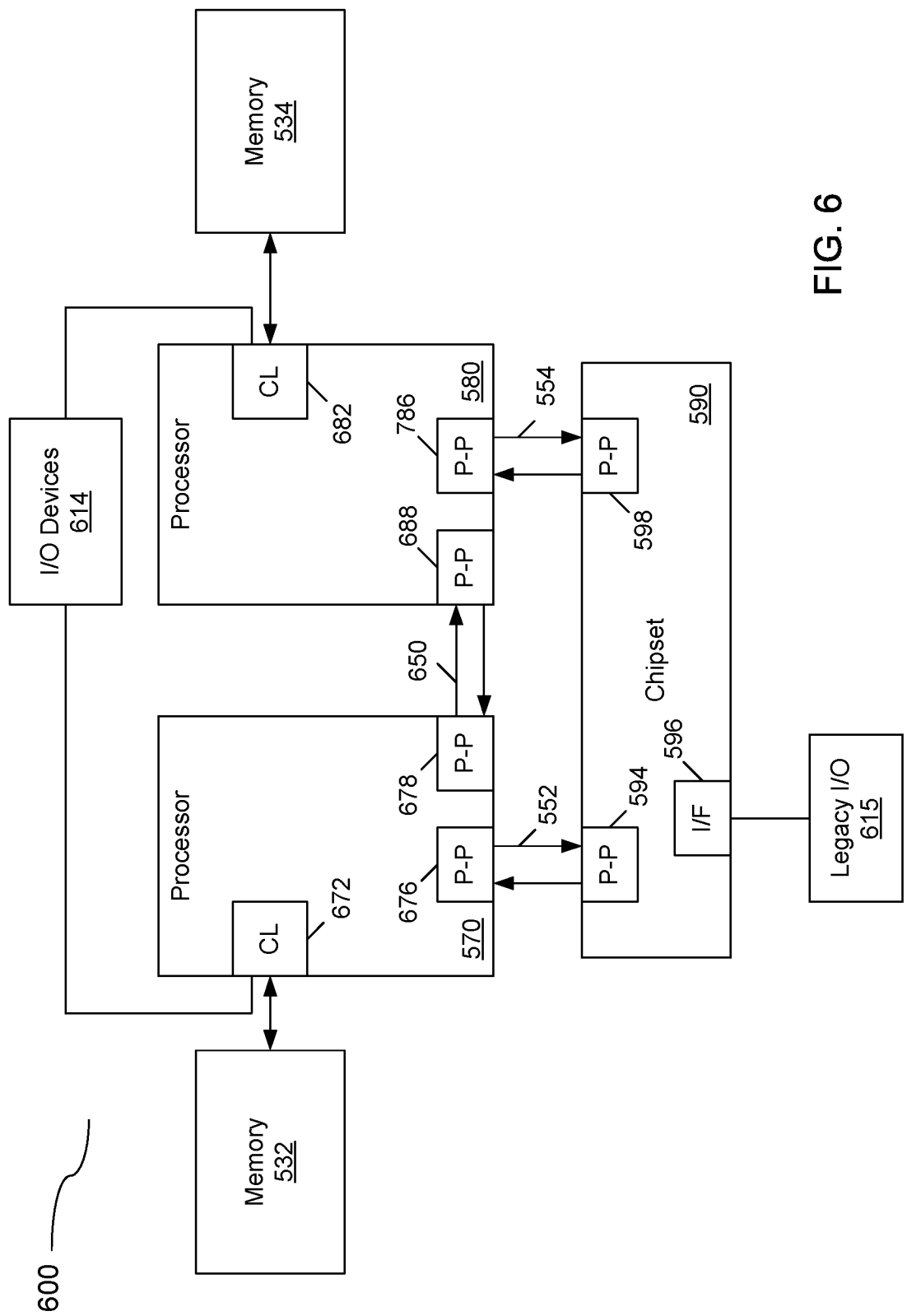
FIG. 6 is a block diagram of a second more specific exemplary system in accordance with an embodiment of the present invention.

Referring now to FIG. 6, shown is a block diagram of a second more specific exemplary system 600 in accordance with an embodiment of the present invention. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 672 and 682, respectively. Thus, the CL 672, 682 include integrated memory controller units and include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Figure 7:
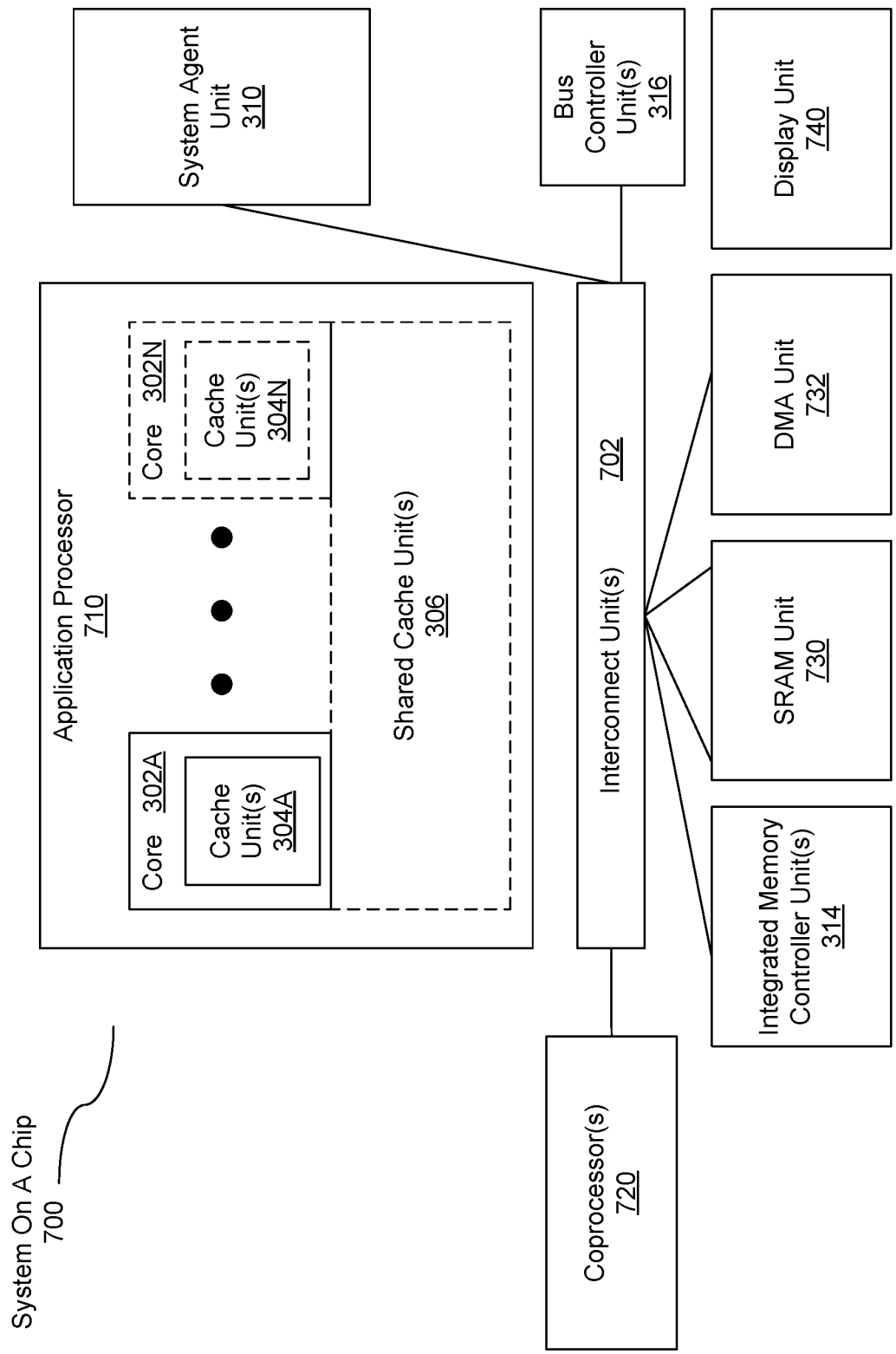
FIG. 7 is a block diagram of a SoC in accordance with an embodiment of the present invention.

Referring now to FIG. 7, shown is a block diagram of a SoC 700 in accordance with an embodiment of the present invention. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 302A-N, cache units 304A-N, and shared cache unit(s) 306; a system agent unit 310; a bus controller unit(s) 316; an integrated memory controller unit(s) 314; a set or one or more coprocessors 720 which may include integrated graphics logic, an image processor, an audio processor, and a video processor; an static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include nontransitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
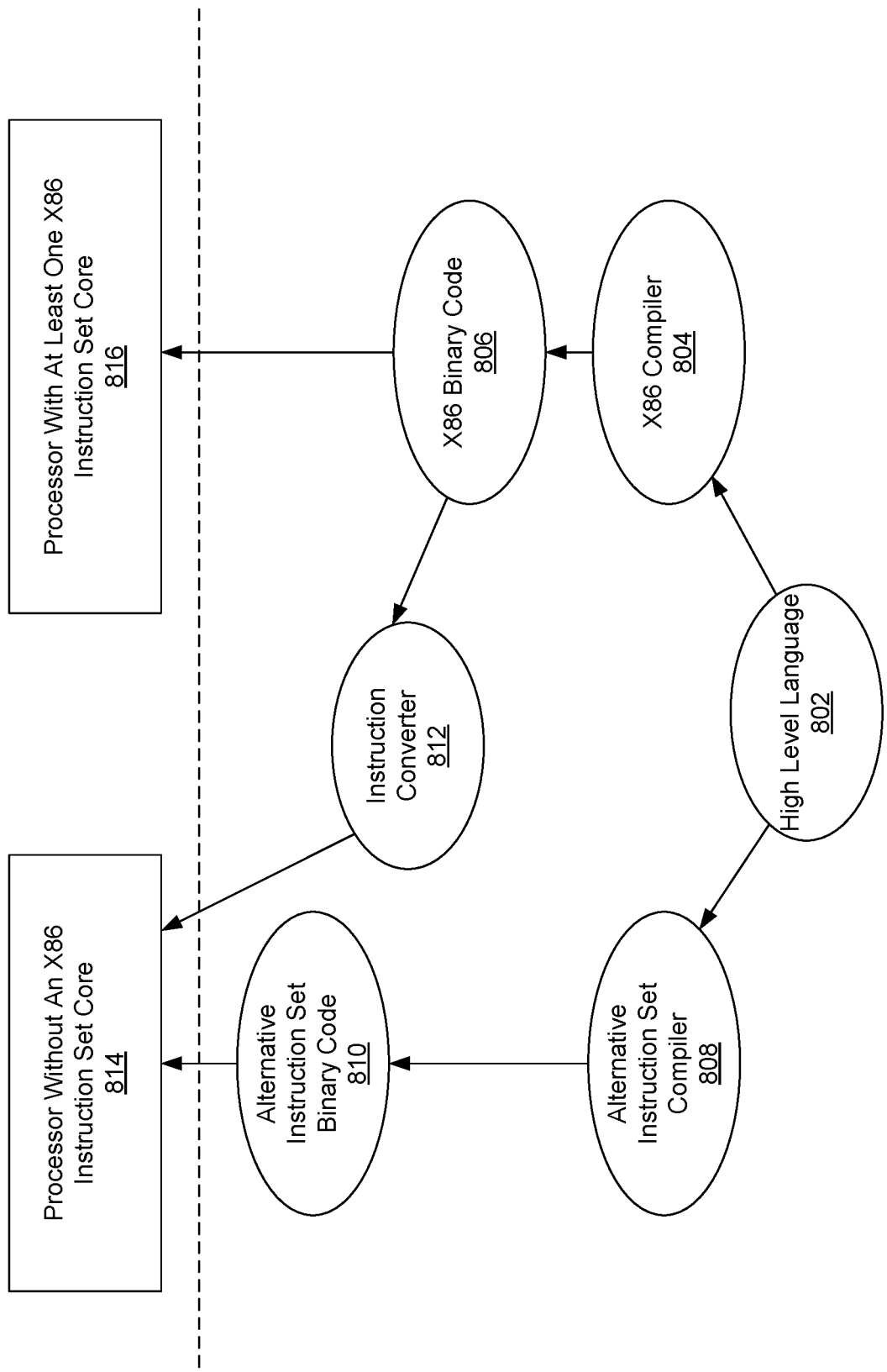
FIG. 8 is a block diagram contrasting the use of a software instruction converter to convert binary instructions in a source instruction set to binary instructions in a target instruction set according to embodiments of the invention.

FIG. 8 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 8 shows a program in a high level language 802 may be compiled using a first compiler 804 to generate a first binary code (e.g., x86) 806 that may be natively executed by a processor with at least one first instruction set core 816. In some embodiments, the processor with at least one first instruction set core 816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel® processor with at least one x86 instruction set core. The first compiler 804 represents a compiler that is operable to generate binary code of the first instruction set 806 (e.g., object code) that can, with or without additional linkage processing, be executed on the processor with at least one first instruction set core 816. Similarly, FIG. 8 shows the program in the high level language 802 may be compiled using an alternative instruction set compiler 808 to generate alternative instruction set binary code 810 that may be natively executed by a processor without at least one first instruction set core 814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 812 is used to convert the first binary code 806 into code that may be natively executed by the processor without an first instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have a first instruction set processor or core to execute the first binary code 806.

Instruction set architecture (ISA) extensions for accelerating data parallel workloads require explicit vector word lengths encoded in the machine representation. One embodiment of the invention extends an existing ISA (e.g., such as an x86 ISA) with a scalar microthreaded instruction processing architecture. In particular, a data parallel single program multiple data (SPMD) microarchitecture may be used to provide for scalable execution datapath sizes beyond the limitations of existing instructions, achieving greater instruction execution throughput with reduced energy consumption.

Current CPU architectures have used multiple generations of sub-word single instruction multiple data (SIMD) extensions for accelerating data parallel operations (e.g., including SSE2, SSE4, AVX, and AVX-512 in the x86 architecture). Each successive generation extends the state and instruction set of the CPU, creating legacy performance upside issues and requiring recompilation of old codes.

Graphics processing units (GPUs) have implemented SPMD architectures using hardware divergence stacks to handle divergent control flow cases. The hardware divergence stack is manipulated via explicit instructions and/or control codes as statically implemented by the finalizer agent for existing GPUs.

One embodiment of the invention includes a SPMD data parallel execution engine that uses a scalar microthread abstraction, similar to programming an array of scalar processors with no architected divergence instructions or control codes. As discussed below, these embodiments are particularly suitable for implementation in an existing ISA which includes a predefined Application Binary Interface (ABI).

Figure 9:
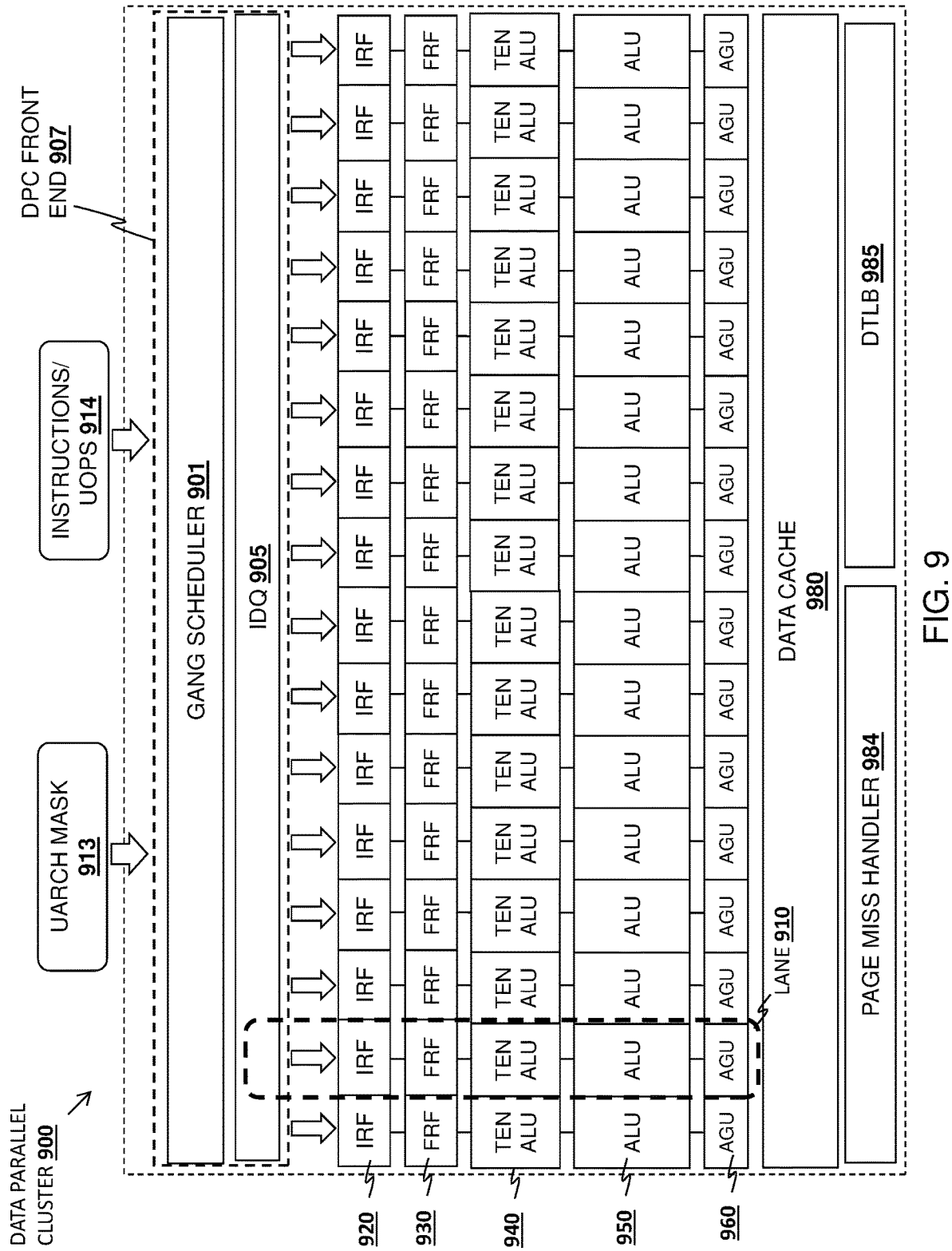
FIG. 9 is a block diagram illustrating one example of a data parallel cluster (DPC) in accordance with an embodiment of the present invention.

FIG. 9 illustrates one example of a data parallel cluster (DPC) 900 which may be integrated within a microarchitecture of a processor and/or may be used as an acceleration engine to execute a particular set of instructions/uops 914. In one embodiment, front end circuitry 907 comprises a gang scheduler 901 to schedule ganged execution of scalar microthreads within a plurality of scalar lanes such as lane 910. The number of scalar lanes in the data parallel cluster 900 can be varied without impacting software. In the illustrated implementation, 16 lanes are shown; however, any number of lanes may be used, depending on the implementation. In one embodiment, 32 lanes may be used.

In one embodiment, the gang scheduler 901 schedules the same instruction on multiple active lanes. A microarchitectural mask 913 (e.g., read from a mask register) disables those lanes that are not required to be active. In one embodiment, the gang scheduler 901 reads the mask values to determine which lanes are to be active for which instructions/uops.

In one embodiment, an instruction decode queue (IDQ) 905 within the front end 907 stores microoperations (uops) of decoded macroinstructions which are added to the IDQ in program order (e.g., in a FIFO implementation). As mentioned, the IDQ 905 may be partitioned for multiple gangs of operation.

Various arrangements for coupling the DPC 900 to a host processor are described below. In an implementation in which instructions are decoded by a host processor, the DPC 900 does not include a decoder to generate the uops prior to execution on the lanes. Alternatively, in an implementation in which macroinstructions are forwarded from a host processor or read directly from memory by the DPC, the front end of the DPC (e.g., the gang scheduler 901) includes a decoder to generate sequences of uops which are then stored in the IDQ prior to execution.

Each lane in the data parallel cluster 900 is coupled to the IDQ 905 from which it receives uops to be executed in parallel. In one embodiment, each lane includes an integer register file (IRF) 920 and a floating-point register file (FRF) 930 for storing integer and floating point operands, respectively. Each lane also includes a tensor arithmetic logic unit (ALU) 940 to perform adaptive lane-wise tensor processing (as described in greater detail below), a per-microthread scalar ALU 950, and a per-microthread, independent address generation unit 960. In one embodiment, the independent AGU 960 provides high throughput address generation for codes with gather/scatter memory access patterns. Other independent functional units may also be allocated to each lane. For example, in one embodiment, each lane is equipped with an independent jump execution unit (JEU) which allows the lanes to diverge and interact with the microarchitectural mask to provide the illusion of independent threads.

The illustrated architecture also includes a shared data cache 980 to store local copies of data for each of the lanes. In one embodiment, if the data parallel cluster 900 is integrated in a chip or system with a host processor, it participates in the cache coherency protocol implemented by the host processor. A page miss handler 984 performs page walk operations to translate virtual addresses to physical (system memory) addresses and a data translation lookaside buffer (DTLB) 985 caches the virtual-to-physical translations.

Figure 10A:
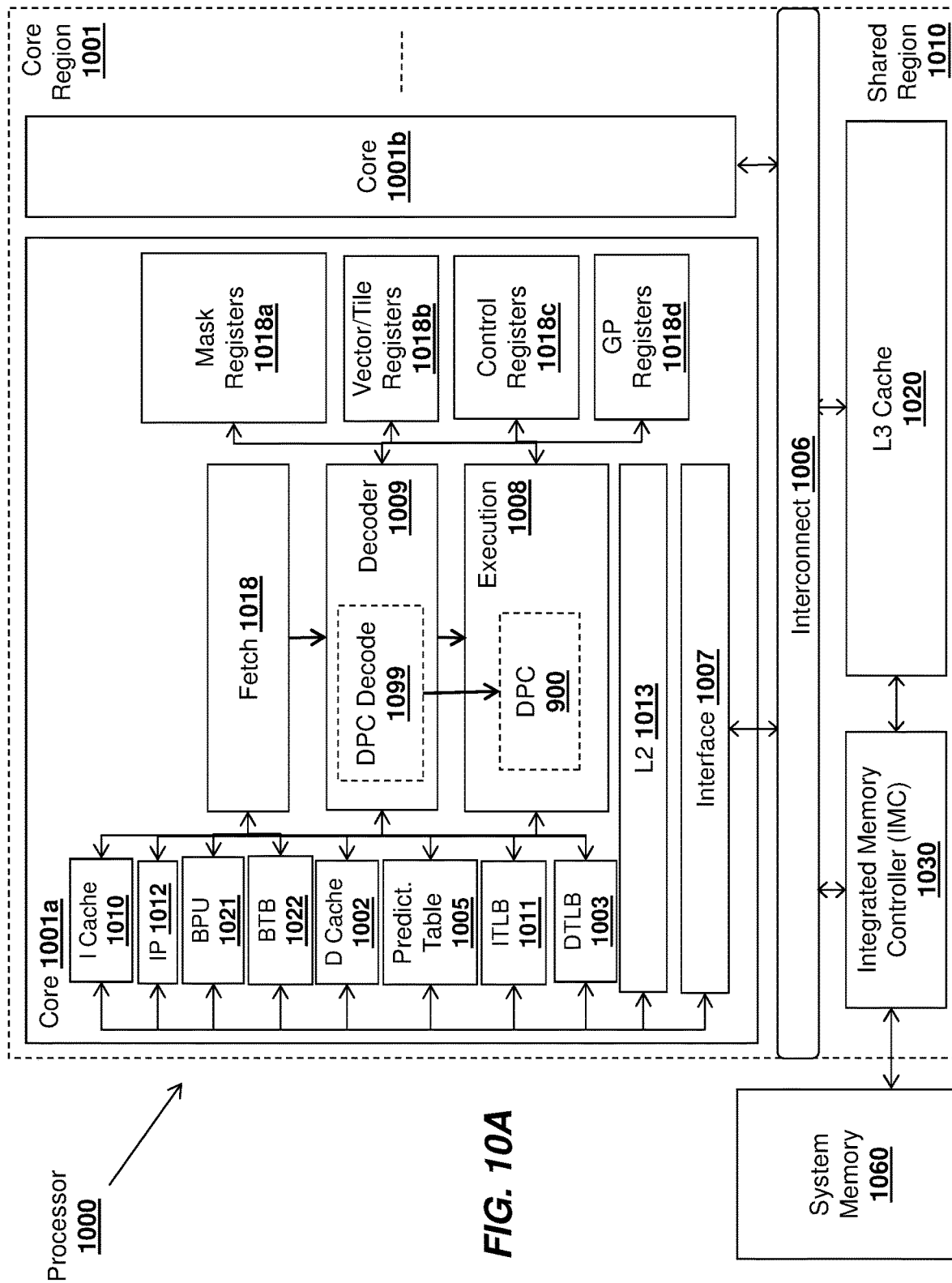
FIGS. 10A-C are block diagrams of the data parallel cluster integrated in a computer system in a variety of ways in accordance with an embodiment of the present invention.
Figure 10B:
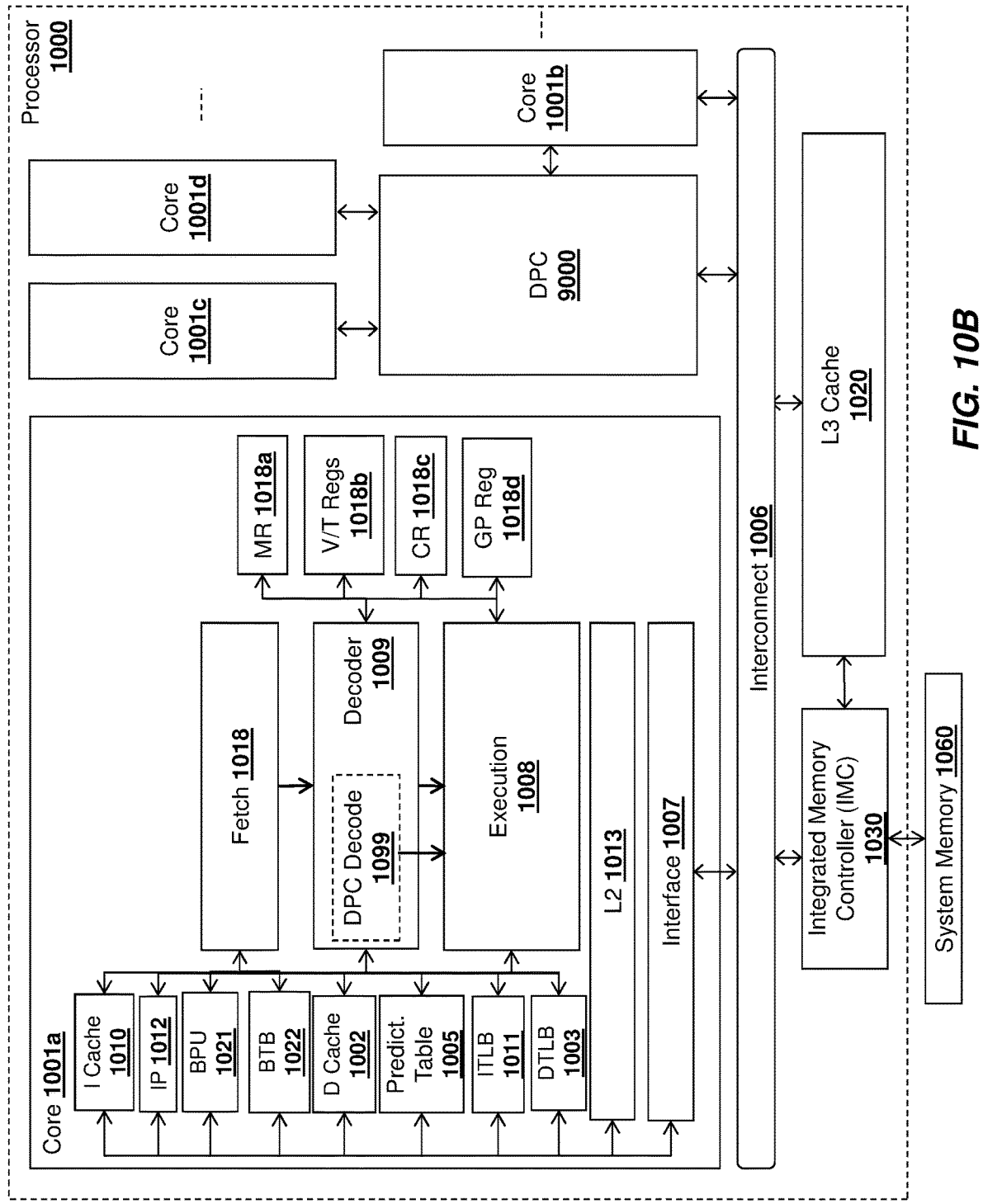
Figure 10C:
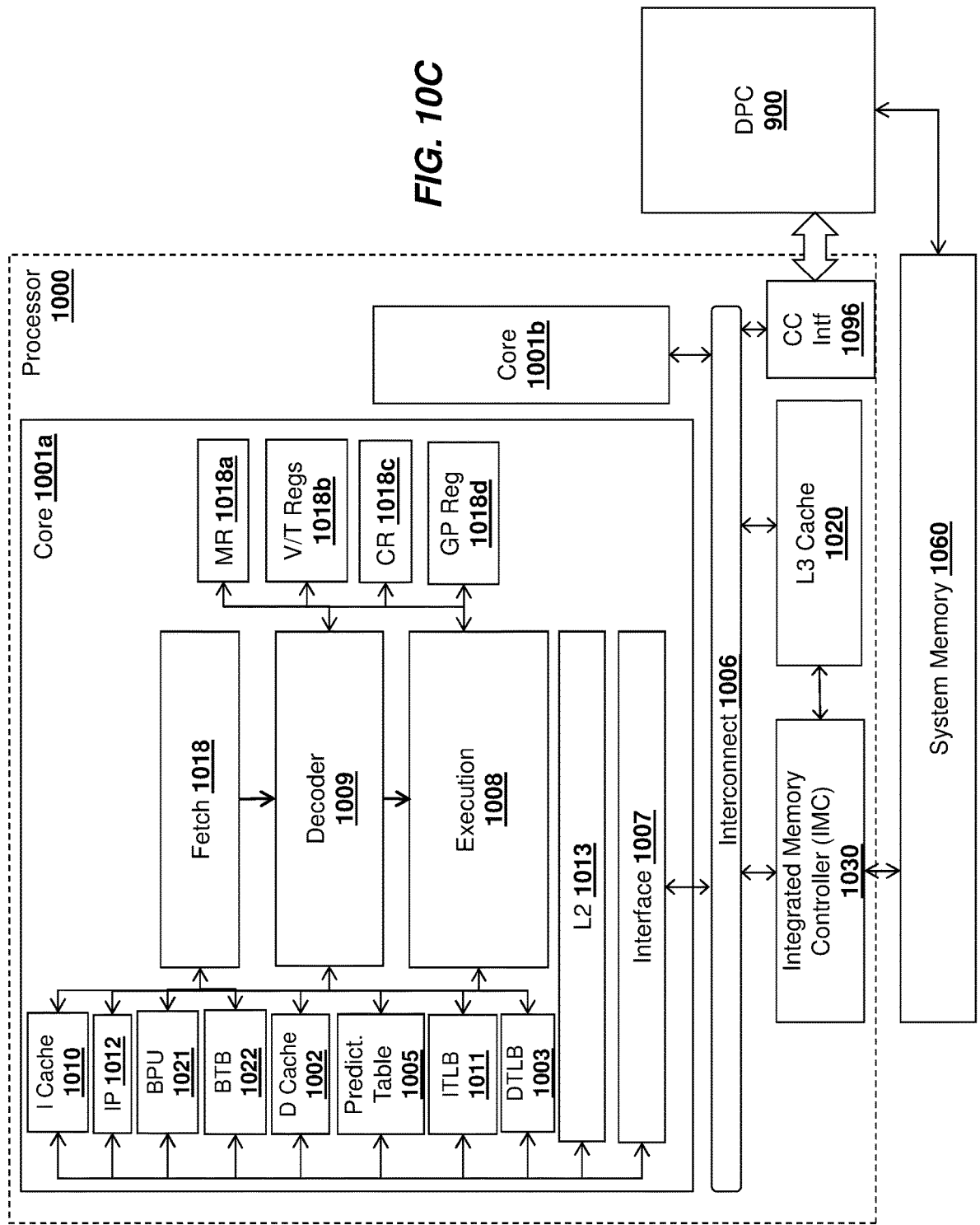

As illustrated in FIGS. 10A-C, the data parallel cluster 900 may be integrated in a computer system in a variety of ways. In FIG. 10A, the DPC 900 is integral to a core 1001a; in FIG. 10B, the DPC 900 is on the same chip and shared by a plurality of cores; and in FIG. 10C, the DPC 900 is on a different chip (but potentially in the same package) as the cores 1001a-b.

Turning first to FIG. 10A, the illustrated architectures include a core region 1001 and a shared, or "uncore" region 1010. The shared region 1010 includes data structures and circuitry shared by all or a subset of the cores 1001a-b. In the illustrated embodiment, the plurality of cores 1001a-b are simultaneous multithreaded cores capable of concurrently executing multiple instruction streams or threads. Although only two cores 1001a-b are illustrated in FIG. 10A for simplicity, it will be appreciated that the core region 1001 may include any number of cores, each of which may include the same architecture as shown for core 1001a. Another embodiment includes heterogeneous cores which may have different instruction set architectures and/or different power and performance characteristics (e.g., low power cores combined with high power/performance cores).

The various components illustrated in FIG. 10A may be implemented in the same manner as corresponding components in FIGS. 1-7. In addition, the cores 1001a may include the components of core 190 shown in FIG. 1B, and may include any of the other processor/core components described herein (e.g., FIGS. 2A-B, FIG. 3, etc.).

Each of the cores 1001a -b include instruction pipeline components for performing simultaneous execution of instruction streams including instruction fetch circuitry 1018 which fetches instructions from system memory 1060 or the instruction cache 1010 and decoder 1009 to decode the instructions. Execution circuitry 1008 executes the decoded instructions to perform the underlying operations, as specified by the instruction operands, opcodes, and any immediate values.

In the illustrated embodiment, the decoder 1009 includes DPC instruction decode circuitry 1099 to decode certain instructions into uops for execution by the DPC 900 (integrated within the execution circuitry 1008 in this embodiment). Although illustrated as separate blocks in FIG. 10A, the DPC decode circuitry 1099 and DPC 900 may be distributed as functional circuits spread throughout the decoder 1009 and execution circuitry 1008.

In an alternate embodiment, illustrated in FIG. 10B, the DPC 900 is tightly coupled to the processor cores 1001a-b over a cache coherent interconnect (e.g., in which a data cache participates in the same set of cache coherent memory transactions as the cores). The DPC 900 is configured as a peer of the cores, participating in the same set of cache coherent memory transactions as the cores. In this embodiment, the decoders 1009 decode the instructions which are to be executed DPC 900 and the resulting microoperations are passed for execution to the DPC 900 over the interconnect 1006. In another embodiment, the DPC 900 includes its own fetch and decode circuitry to fetch and decode instructions, respectively, from a particular region of system memory 1060. In either implementation, after executing the instructions, the DPC 900 may store the results to the region in system memory 1460 to be accessed by the cores 1001a-b.

FIG. 10C illustrates another embodiment in which the DPC is on a different chip from the cores 1001a-b but coupled to the cores over a cache coherent interface 1096. In one embodiment, the cache coherent interface 1096 uses packet-based transactions to ensure that the data cache 980 of the DPC 900 is coherent with the cache hierarchy of the cores 1001a-b.

Also illustrated in FIGS. 10A-C are general purpose registers (GPRs) 1018d, a set of vector/tile registers 1018b, a set of mask registers 1018a (which may include tile mask registers as described below), and a set of control registers 1018c. In one embodiment, multiple vector data elements are packed into each vector register which may have a 512 bit width for storing two 256 bit values, four 128 bit values, eight 64 bit values, sixteen 32 bit values, etc. Groups of vector registers may be combined to form the tile registers described herein. Alternatively, a separate set of 2-D tile registers may be used. However, the underlying principles of the invention are not limited to any particular size/type of vector/tile data. In one embodiment, the mask registers 1018a include eight 64-bit operand mask registers used for performing bit masking operations on the values stored in the vector registers 1018b (e.g., implemented as mask registers k0-k7 described above). However, the underlying principles of the invention are not limited to any particular mask register size/type. A set of one or more mask registers 1018a may implement the tile mask registers described herein.

The control registers 1018c store various types of control bits or "flags" which are used by executing instructions to determine the current state of the processor core 1001a. By way of example, and not limitation, in an x86 architecture, the control registers include the EFLAGS register.

An interconnect 1006 such as an in-die interconnect (IDI) or memory fabric implementing an IDI/coherence protocol communicatively couples the cores 1001a-b (and potentially a the DPC 900) to one another and to various components within the shared region 1010. For example, the interconnect 1006 couples core 1001a via interface 1007 to a level 3 (L3) cache 1013 and an integrated memory controller 1030. In addition, the interconnect 1006 may be used to couple the cores 1001a -b to the DPC 900.

The integrated memory controller 1030 provides access to a system memory 1060. One or more input/output (I/O) circuits (not shown) such as PCI express circuitry may also be included in the shared region 1010.

An instruction pointer register 1012 stores an instruction pointer address identifying the next instruction to be fetched, decoded, and executed. Instructions may be fetched or prefetched from system memory 1060 and/or one or more shared cache levels such as an L2 cache 1013, the shared L3 cache 1020, or the L1 instruction cache 1010. In addition, an L1 data cache 1002 stores data loaded from system memory 1060 and/or retrieved from one of the other cache levels 1013, 1020 which cache both instructions and data. An instruction TLB (ITLB) 1011 stores virtual address to physical address translations for the instructions fetched by the fetch circuitry 1018 and a data TLB (DTLB) 1003 stores virtual-to-physical address translations for the data processed by the decode circuitry 1009 and execution circuitry 1008.

A branch prediction unit 1021 speculatively predicts instruction branch addresses and branch target buffers (BTBs) 1022 for storing branch addresses and target addresses. In one embodiment, a branch history table (not shown) or other data structure is maintained and updated for each branch prediction/misprediction and is used by the branch prediction unit 1002 to make subsequent branch predictions.

Note that FIGS. 10A-C are not intended to provide a comprehensive view of all circuitry and interconnects employed within a processor. Rather, components which are not pertinent to the embodiments of the invention are not shown. Conversely, some components are shown merely for the purpose of providing an example architecture in which embodiments of the invention may be implemented.

Returning to FIG. 9, the processing cluster 900 is arranged into a plurality of lanes 910 that encapsulate execution resources (e.g., an IRF 920, an FRF 930, a tensor ALU 940, an ALU 950, and an AGU 960) for several microthreads. Multiple threads share a given lane's execution resources in order to tolerate pipeline and memory latency. The per-microthread state for one implementation is a subset of a modern processor state.

Figure 11:
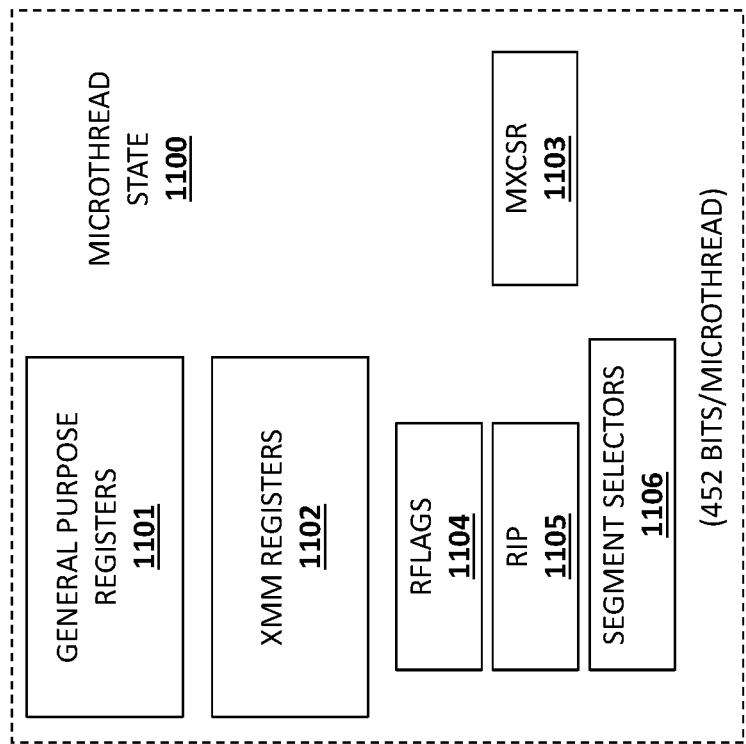
FIG. 11 illustrates one example of a microthread state in accordance with an embodiment of the present invention.

FIG. 11 illustrates one example of a microthread state 1100 which is a subset of a scalar x86 state. The microthread state 1100 includes state from general purpose registers 1101 (e.g., sixteen 64-bit registers), XMM registers 1102 (e.g., thirty-two 64-bit registers), an RFLAGS register 1104, an instruction pointer register 1105, segment selectors 1106, and the MXCSR register 1103. Using a subset of a scalar x86 is convenient for programmers, is software compatible with existing x86 codes, and requires minimal changes to current compilers and software toolchains. The lanes of this embodiment execute scalar, user-level instructions. Of course, the underlying principles of the invention are not limited to this particular arrangement.

Figure 12:
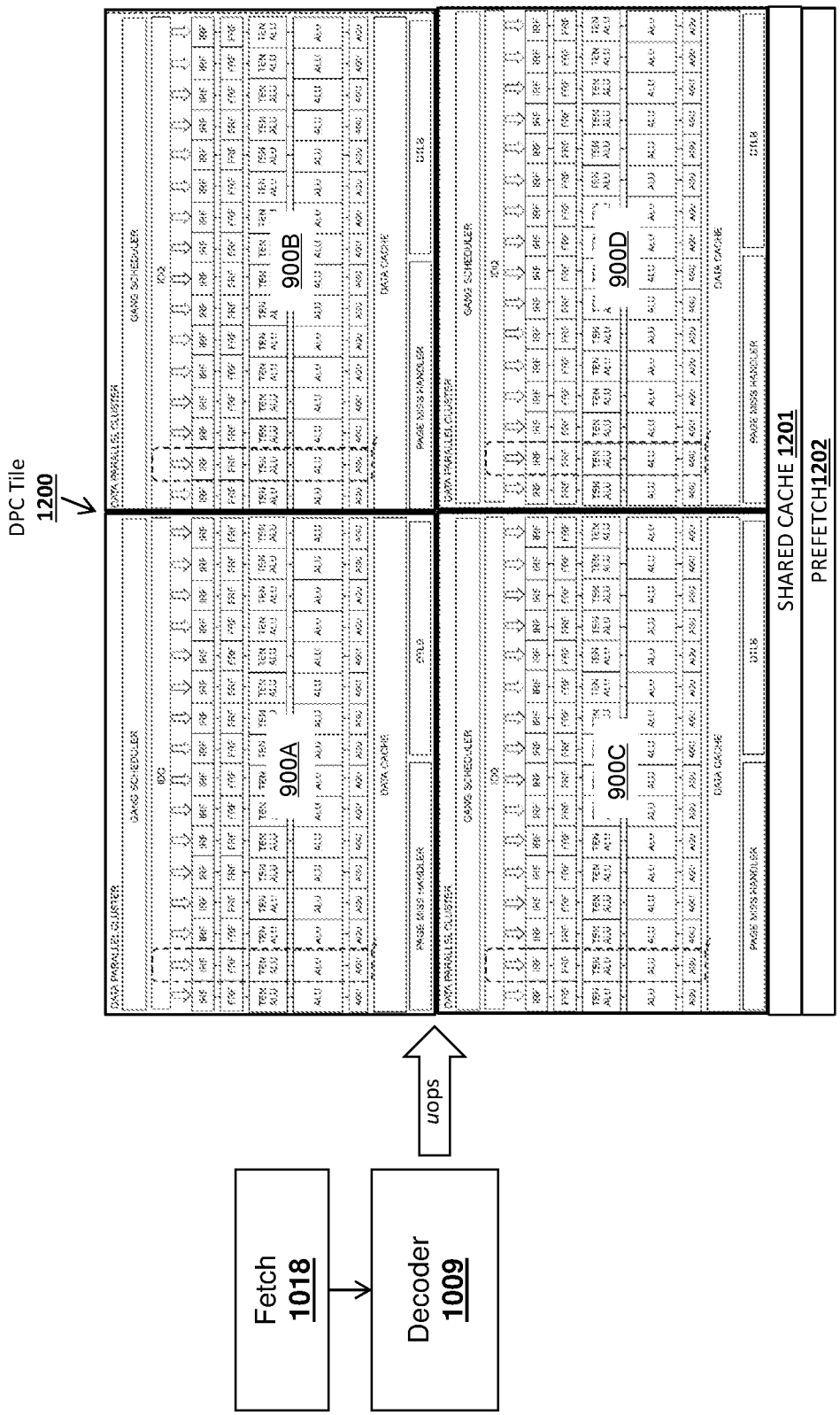
FIG. 12 is a block diagram of multiple data parallel clusters collocated into a larger unit of scaling in accordance with an embodiment of the present invention.

In one embodiment, illustrated in FIG. 12, multiple data parallel clusters 900A-D are collocated into a larger unit of scaling referred to as a "DPC tile" 1200. The various data parallel clusters 900A-D may be coupled to one another over a high speed interconnect of fabric. The DPC tile 1200 may be integrated within a processor or computer system using any of the microarchitectural implementations described above with respect to the single DPC 900 in FIG. 10A-C (i.e., DPC tile 1200 may be substituted for the DPC 900 in these figures).

The DPC tile 1200 includes a shared cache 1201 and relies on the existing fetch 1018 and decoder 1009 of one or more cores. A prefetcher 1202 prefetches data from system memory and/or the cache hierarchy in anticipation of uops executed on the data parallel clusters 900A-D. Although not illustrated, the shared cache 1201 may be coupled between the data parallel clusters 900A-D and each DPC 900A-D may be coupled to the on-chip interconnection network (e.g., IDI).

Sharing the execution resources of a processor across a whole cluster amortizes the relatively complex decode process performed by decoder 1009. One embodiment of the invention can support hundreds of microthreads executing instructions using a tiny fraction of the fetch 1018 and decoder 1009 resources of a conventional processor design.

Figure 13:
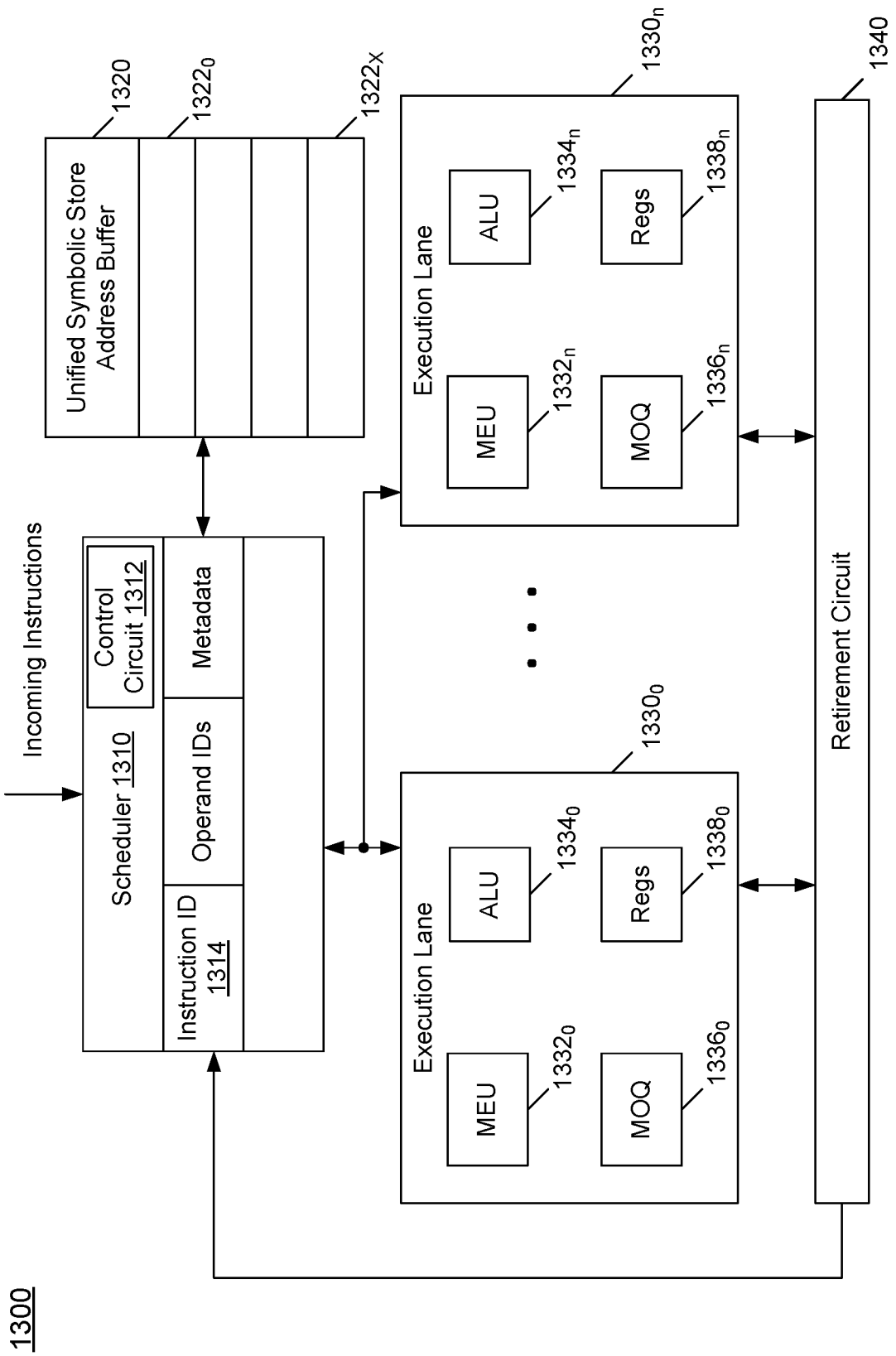
FIG. 13 is a block diagram of a portion of a processor in accordance with an embodiment.

Referring now to FIG. 13, shown is a block diagram of a portion of a processor in accordance with an embodiment. More specifically as shown in FIG. 13, the portion of a processor 1300 shown is a SPMD processor. As illustrated, a scheduler 1310 receives incoming instructions and stores information associated with the instructions in entries 1314. Scheduler 1310, upon dispatch of a store instruction, generates a symbolic store address for inclusion in a unified symbolic store address buffer 1320. As seen, each entry 1314 may include various information associated with a given instruction, including an instruction identifier, identifiers for various source and/or destination operands of the instruction, and metadata associated with the instruction, such as ready indicators to indicate whether the corresponding operands are available for execution.

Understand that this scheduler, in an embodiment, may be implemented with a reservation station or other scheduling logic that tracks instructions or uops and identifies operands for these instructions and their readiness. In some cases, scheduler 1310 further may check for conflicts between instructions, e.g., via a control circuit 1312. When a given instruction is ready for execution and no conflict is detected, the instruction may be dispatched from scheduler 1310 to a plurality of execution lanes $1330_0$-$1330_n$.

As further illustrated in FIG. 13, unified symbolic store address buffer 1320 includes a plurality of entries $1322_0$-$1322_x$. In an embodiment, each entry 1322 may store a symbolic store address as generated by scheduler 1310. In some cases, information present within a given entry 1314 of scheduler 1310 may be used to generate this symbolic address. In one embodiment, this symbolic address generation may obtain fields present in a reservation station entry and copy them into symbolic store address buffer 1320. Of course in other embodiments additional information such as a base index and register affine relationships may be stored in entries 1322 of symbolic store address buffer 1320.

As illustrated in the high level of FIG. 13, each execution lane 1330 may include one or more memory execution units 1332 and one or more arithmetic logic units (ALUs) 1334. In addition, for load instructions handled within memory execution unit 1332, a corresponding load address may be generated and stored in a memory order queue 1336. As further shown, memory execution units 1332 and ALUs 1334 may use information stored in a register file 1338. Results of execution of instructions may be provided to a retirement circuit 1340, which may operate to retire an instruction when the instruction has been appropriately executed in each execution lane 1330. Understand while shown at this high level in the embodiment of FIG. 13, many variations and alternatives are possible.

Figure 14:
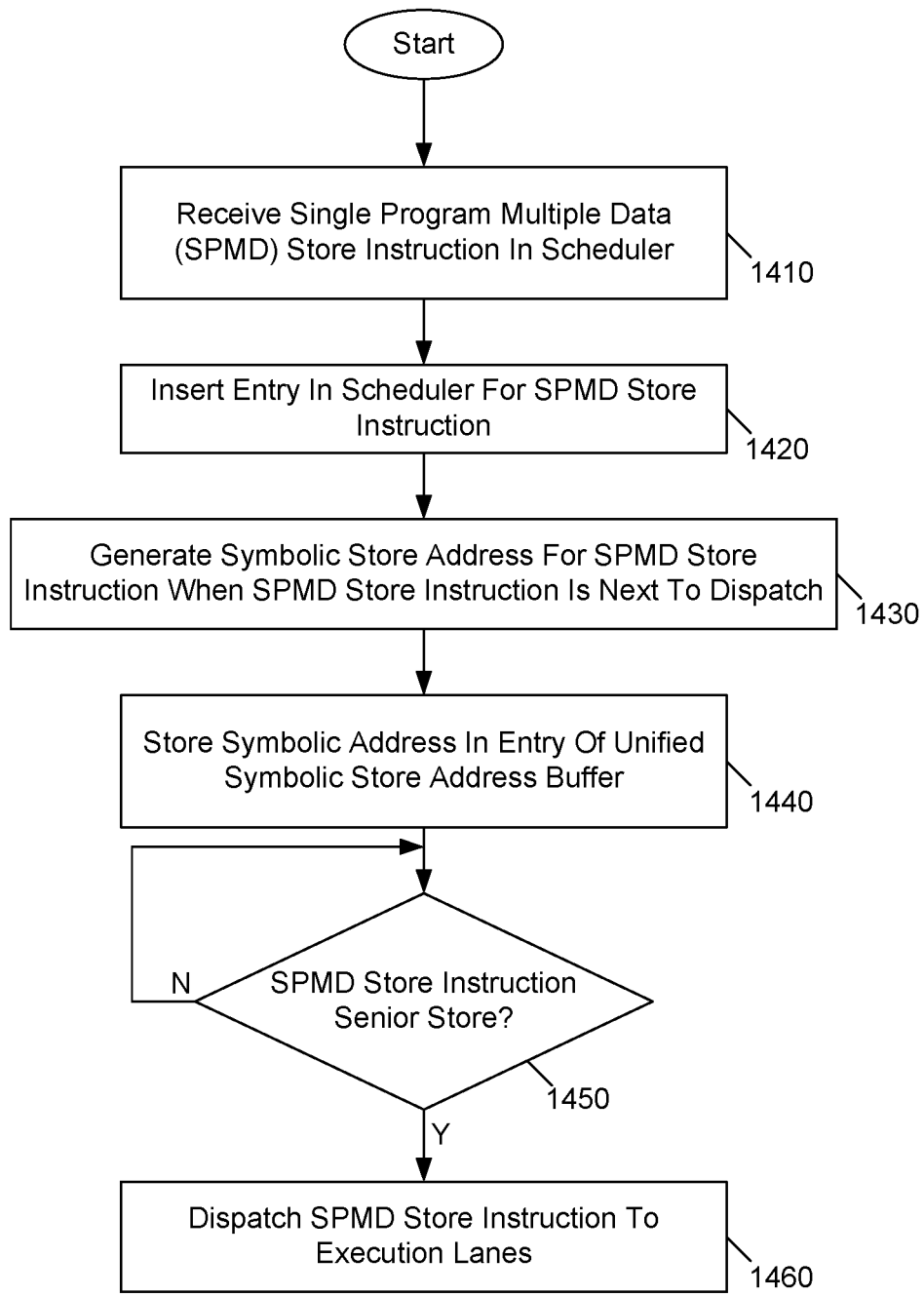
FIG. 14 is a flow diagram of a method in accordance with one embodiment of the present invention.

Referring now to FIG. 14, shown is a flow diagram of a method in accordance with one embodiment of the present invention. More specifically, method 1400 of FIG. 14 is a method for generating a symbolic address for a store instruction and inserting the symbolic address in a unified symbolic store address buffer at store instruction dispatch. As such, method 1400 may be performed by scheduler circuitry such as may be implemented in hardware circuitry, firmware, software and/or combinations thereof. In a particular embodiment, scheduler circuitry of an SPMD processor may, in response to receipt of a store instruction, generate a symbolic address for the instruction, insert it in the unified symbolic store address buffer, and dispatch the store instruction to multiple execution lanes for execution.

As illustrated, method 1400 begins at block 1410, where an SPMD store instruction is received in the scheduler. In an embodiment, the scheduler may include a reservation station or other scheduler circuitry to track incoming instructions and schedule them for dispatch to the execution lanes. At block 1420, an entry is inserted in the scheduler for this SPMD store instruction. Thereafter, at block 1430, a symbolic address, namely a symbolic store address, is generated for this store instruction. More specifically, this symbolic store address may be generated when the SPMD store instruction is the next instruction to be dispatched. As described herein, this symbolic address may be based at least in part on a logical concatenation of multiple fields or constituent components based on instruction information. In some embodiments, information present in a reservation station entry for the store instruction may be used to generate the symbolic store address. Next, at block 1440 the symbolic address may be stored in an entry of a unified symbolic store address buffer. With this arrangement, the need for per lane store address buffers is avoided, and a concomitant reduction in address comparison circuitry to perform per lane address comparisons for succeeding load instructions is realized.

Still with reference to FIG. 14, at diamond 1450 it is determined whether the SPMD store instruction is the senior store instruction within the pipeline, such that it is ready to be dispatched. When it is determined that the SPMD store instruction is the senior store, control passes to block 1460, where the store instruction is dispatched to the execution lanes for execution. Understand that each execution lane may, based upon its internal state (e.g., register contents), generate different per lane store addresses to access different memory locations for storage of corresponding store data. Also understand that at this point in the execution, the store data itself need not be available, nor do the source address register operands for calculating the address need be ready. Understand while shown at this high level in the embodiment of FIG. 14, many variations and alternatives are possible.

Figure 15:
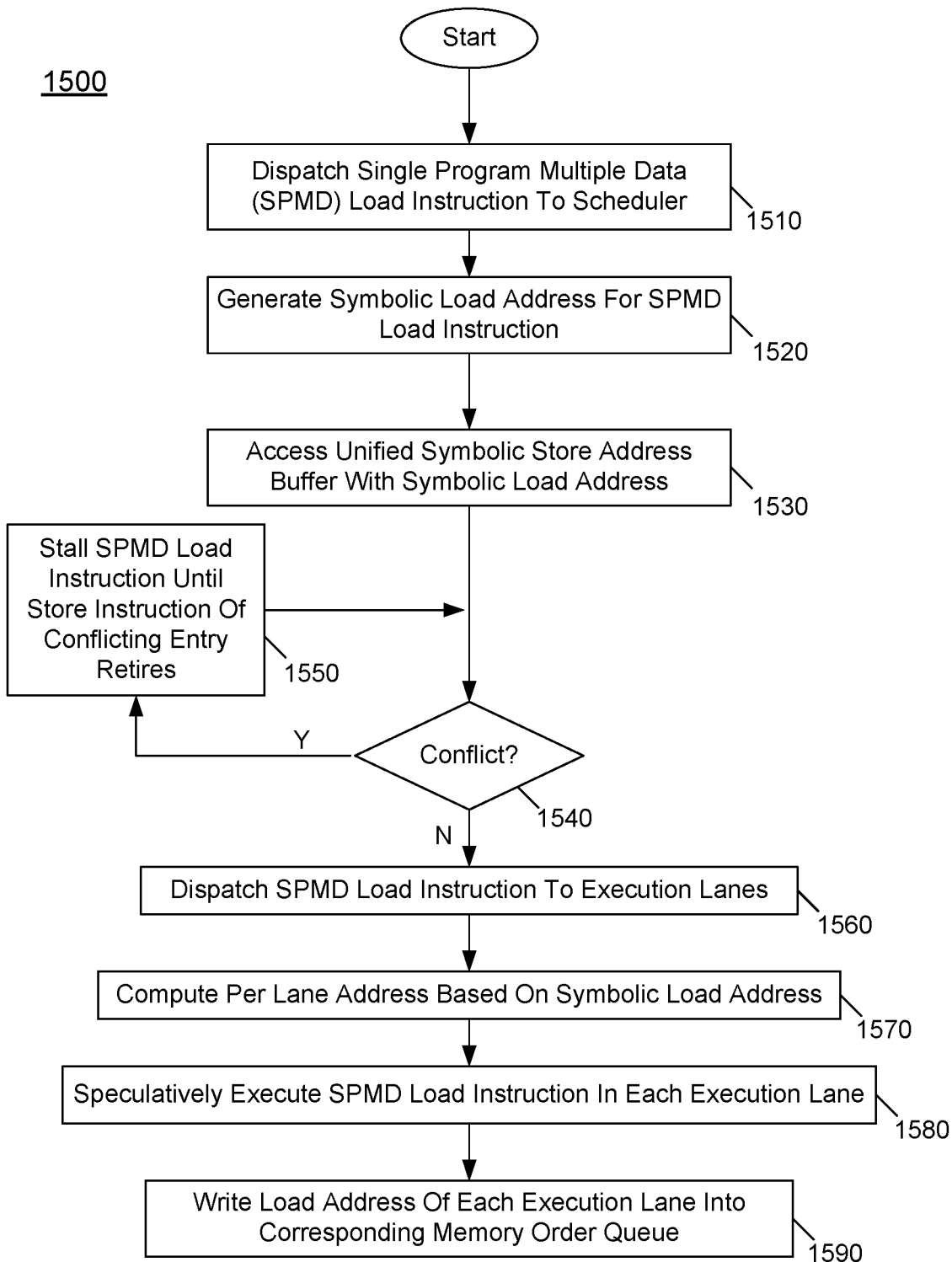
FIG. 15 is a flow diagram of a method in accordance with another embodiment of the present invention.

Referring now to FIG. 15, shown is a flow diagram of a method in accordance with another embodiment of the present invention. More specifically, method 1500 is a method for accessing a unified symbolic store address buffer on dispatch of a younger load instruction. As such, method 1500 may be performed by scheduler circuitry such as may be implemented in hardware circuitry, firmware, software and/or combinations thereof. In a particular embodiment, scheduler circuitry of an SPMD processor may, in response to receipt of a load instruction, generate a symbolic address for the instruction, and access the unified symbolic store address buffer, to identify potential conflicts between this load instruction and one or more in-flight store instructions. Thus as described herein, such operation may detect conflicts between an older store instruction that has not yet retired and a younger load instruction dependent upon such older store instruction.

As illustrated, method 1500 begins at block 1510 by dispatching an SPMD load instruction to a scheduler. At block 1520 a symbolic load address for this load instruction is generated. Note that this symbolic address generation may occur according to the same symbolic mechanism used for generating symbolic store addresses for store instructions. Thereafter at block 1530 the unified symbolic store address buffer is accessed using this symbolic load address. In this manner, an address comparison operation using only a single load address is performed for a given load instruction, rather than requiring a per lane address comparison in the absence of the symbolic address mechanisms described herein. As such, chip area and power consumption may be reduced dramatically.

Based upon the address comparison at block 1530, it is determined whether a conflict exists (diamond 1540). That is, if the symbolic load address matches one or more entries in the unified symbolic store address buffer, this indicates a conflict in that the load instruction is dependent upon one or more earlier store instructions. In this situation, control passes to block 1550 where the load instruction may be stalled. More specifically, this load instruction may remain stalled in the scheduler until the store instruction of the conflicting entry retires. In other situations, other stall handling techniques may be performed such that the load instruction is stalled until other ordering requirements are met, such as ensuring that all earlier store operations have retired or so forth, depending upon a desired implementation and aggressiveness or conservativeness desired with regard to potential mis-speculations.

Still with reference to FIG. 15, instead if it determined that no conflict is detected between a load instruction and older store instructions, control passes to block 1560 where the load instruction may be dispatched to the multiple execution lanes for execution.

Note that FIG. 15 further shows operations performed on a per lane basis during execution of the load instruction. Specifically, at block 1570 in each execution lane a load address is computed based on the symbolic load address. That is, in each execution lane and based upon its own register state, a given load address can be computed. Next at block 1580, the load instruction can therefore be speculatively executed in each lane using the per lane load address (assuming the load instruction is not previously stalled at block 1550). Finally, at block 1590, each lane may write its load address into a corresponding memory order queue of the execution lane. With this memory order queue arrangement on a per lane basis, it can be determined during store instruction retirement (as described further below) whether a conflict exists between a store instruction set to retire and one or more speculatively executed load instructions following that store instruction in program order. In an embodiment, this per lane memory order queue may include a plurality of entries each to store, for a given load instruction, the load address computed in the execution lane, and an identifier, e.g., of a reorder buffer entry corresponding to the given load instruction. Understand while shown at this high level in the embodiment of FIG. 15, many variations and alternatives are possible.

Figure 16:
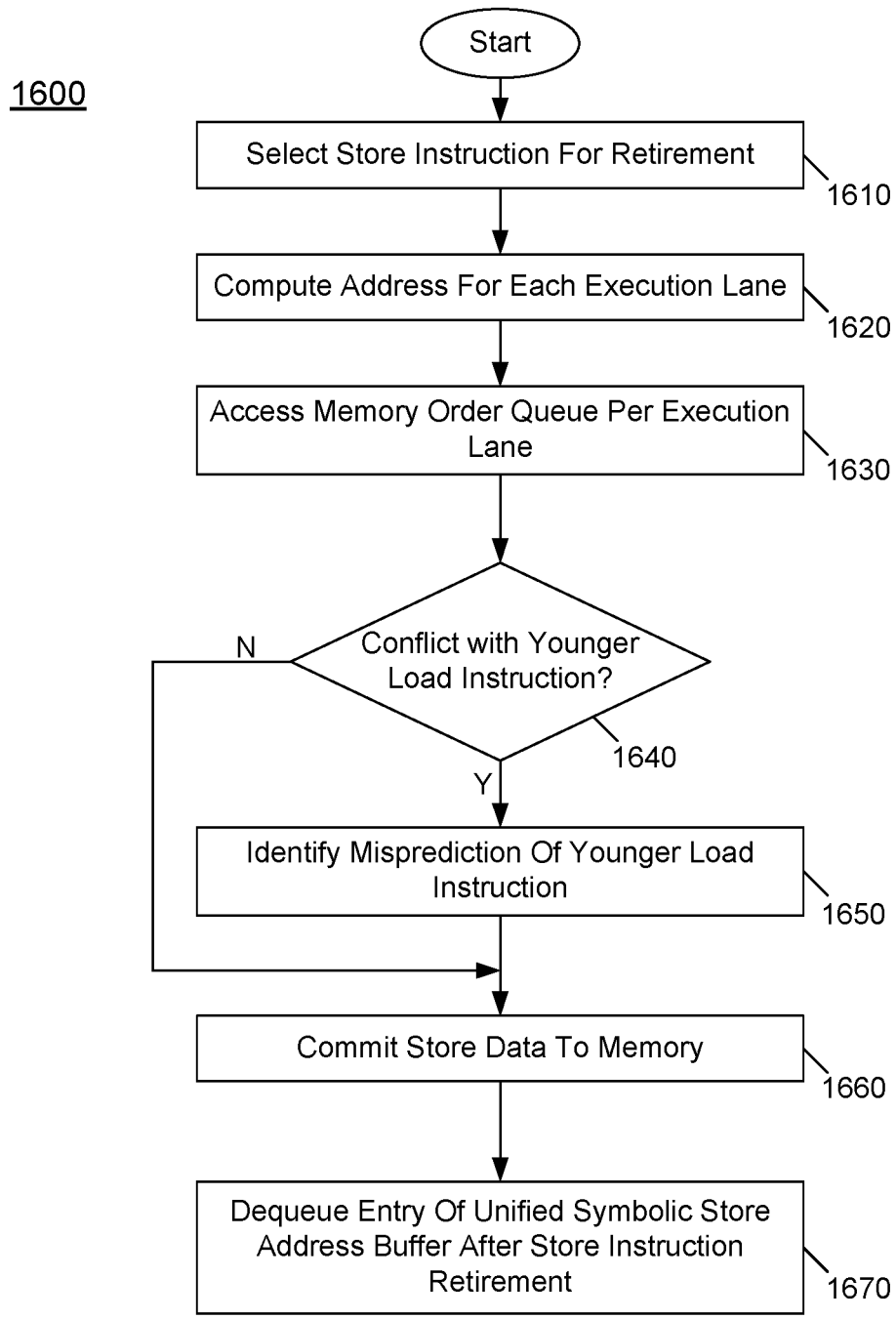
FIG. 16 is a flow diagram of a method in accordance with yet another embodiment of the present invention.

Referring now to FIG. 16, shown is a flow diagram of a method in accordance with yet another embodiment of the present invention. More specifically, method 1600 is a method for retiring store instructions that take advantage of the eager dispatch of dependent younger load instructions as described herein. In an embodiment, method 1600 may be performed by retirement circuitry and/or within the execution lanes themselves, such as may be implemented in hardware circuitry, firmware, software and/or combinations thereof As illustrated, method 1600 begins by selecting a store instruction for retirement (block 1610). In an embodiment, a store instruction may be selected when it is the top entry in a reorder buffer or other retirement structure. Understand that a store instruction is ready for retirement when address and data operands are ready across all active lanes and optionally data has moved to a store data buffer. Next at block 1620 an address for this store instruction is computed for each execution lane. Note that at this point, namely at store data dispatch, this address computation occurs, which advantageously enables efficient operation, since source address register operand values do not need to be present until this point, rather than requiring such values be available at dispatch of the store instruction.

Still with reference to FIG. 16, next at block 1630 the per execution lane memory order queue can be accessed using this computed address. The address comparison with this computed store address in the memory order queue access can be used to identify any speculatively executed load instructions that are dependent upon this ready to retire store instruction. Based on this memory order queue access it is determined at diamond 1640 whether there is a conflict with a younger load instruction. Note it is possible for certain execution lanes to have no conflict, while other lanes have a conflict. If there is no conflict (namely where there is a miss between the store address and the load addresses present in the memory order queue), control passes to block 1660 where the store data may be committed to memory and thus the store instruction retires. It is at this point that the symbolic store address for this store instruction is dequeued from the unified symbolic store address buffer. Thus at this point, after the store instruction has been executed by all execution lanes (and thus not occurring at store instruction dispatch), the entry in the unified symbolic store address buffer is dequeued once the store instruction validly retires (block 1670).

Still with reference to FIG. 16, instead if it is determined that there is a conflict with a younger load instruction, control passes from diamond 1640 to block 1650 where a mis-prediction of the younger load instruction is thus identified, and at least part of the pipeline of the execution lane may be cleared. To this end, various mechanisms to handle the misprediction or mis-speculation may occur. For example, in a conservative approach, all younger load instructions (namely those load instructions younger than the ready to retire store instruction) may be flushed from the pipeline. In other cases, only those load instructions from the identified misprediction and younger may be flushed. In any event, appropriate flush operations to flush some or all of the execution lane pipeline may occur. Thereafter, control passes to block 1660, discussed above where the store data for the store instruction may commit to memory. Understand while shown at this high level in the embodiment of FIG. 16, many variations and alternatives are possible.

The following examples pertain to further embodiments.

In one example, an apparatus comprises: a plurality of execution lanes to perform parallel execution of instructions; and a unified symbolic store address buffer coupled to the plurality of execution lanes, the unified symbolic store address buffer comprising a plurality of entries each to store a symbolic store address for a store instruction to be executed by at least some of the plurality of execution lanes.

In an example, the apparatus further includes a scheduler to generate the symbolic store address based on at least some address fields of the store instruction, the symbolic store address comprising a plurality of fields including a displacement field, a base register field, and an index register field.

In an example, the plurality of fields further includes a scale factor field and an operand size field.

In an example, the scheduler is, for a load instruction following the store instruction in program order, to generate a symbolic load address for the load instruction based on at least some address fields of the load instruction and access the unified symbolic store address buffer based on the symbolic load address, to determine whether the load instruction conflicts with an in-flight store instruction.

In an example, in response to a determination that the load instruction conflicts with the in-flight store instruction, the scheduler is to suppress the load instruction until the in-flight store instruction completes.

In an example, in response to a determination that the load instruction does not conflict with the in-flight store instruction, the scheduler is to speculatively dispatch the load instruction to the plurality of execution lanes.

In an example, in response to the speculative dispatch of the load instruction, at least some of the plurality of execution lanes are to compute a lane load address for the load instruction, execute the load instruction and store the lane load address into a memory order queue of the execution lane.

In an example, at retirement of the store instruction, each of the plurality of execution lanes is to compute a lane store address for the store instruction and determine based at least in part on contents of the memory order queue whether one or more load instructions conflict with the store instruction.

In an example, in response to a determination of the conflict in a first execution lane, the first execution lane is to flush the one or more load instructions from the first execution lane.

In an example, the apparatus is to dynamically disable speculative execution of load instructions based at least in part on a performance metric of an application in execution.

In an example, the performance metric comprises a mis-speculation rate.

In another example, a method comprises: receiving, in a scheduler of a processor, a SPMD store instruction; generating a symbolic address for the SPMD store instruction; storing the symbolic address for the SPMD store instruction in an entry of a unified symbolic store address buffer; dispatching the SPMD store instruction to a plurality of execution lanes of the processor; and speculatively dispatching a load instruction following the SPMD store instruction in program order to the plurality of execution lanes based at least in part on access to the unified symbolic store address buffer with a symbolic address for the load instruction.

In an example, the method further comprises preventing the load instruction from being speculatively dispatched when the symbolic address for the load instruction matches an entry in the unified symbolic store address buffer.

In an example, the method further comprises generating the symbolic address for the SPMD store instruction based on an address of the SPMD store instruction, the symbolic address for the SPMD store instruction comprising a plurality of fields including a displacement field, a base register field, an index register field, a scale factor field and an operand size field.

In an example, the method further comprises, at retirement of the SPMD store instruction: computing, in each of the plurality of execution lanes, a lane store address for the SPMD store instruction; and accessing a memory order queue of the corresponding execution lane using the lane store address to determine whether a conflict exists between the SPMD store instruction and one or more speculatively executed load instructions following the SPMD store instruction in program order.

In an example, the method further comprises preventing speculatively dispatching load instructions when a mis-speculation rate exceeds a threshold.

In an example, the method further comprises dequeuing the entry of the unified symbolic store address buffer including the symbolic address for the SPMD store instruction when the SPMD store instruction is retired.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system includes a processor and a system memory coupled to the processor. The processor may include: a host processor comprising a plurality of cores, where a first core is to execute a first thread; and a data parallel cluster coupled to the host processor. The data parallel cluster in turn may include: a plurality of execution lanes to perform parallel execution of instructions of a second thread related to the first thread; a scheduler to generate, at store address dispatch of a store instruction to be executed by the plurality of execution lanes and prior to computation of a lane store address for the store instruction by each of the plurality of execution lanes, a symbolic store address for the store instruction based on an address of the store instruction; and a unified symbolic store address buffer coupled to the plurality of execution lanes to store the symbolic store address.

In an example, the scheduler is, for a load instruction following the store instruction in program order, to generate a symbolic load address for the load instruction based on an address of the load instruction and access the unified symbolic store address buffer based on the symbolic load address to determine whether the load instruction conflicts with an in-flight store instruction.

In an example, in response to a determination that the load instruction does not conflict with the in-flight store instruction, the plurality of execution lanes are to compute a lane load address for the load instruction, speculatively execute the load instruction and store the lane load address in a memory order queue of the execution lane, and at retirement of the store instruction compute the lane store address for the store instruction and determine, based at least in part on contents of the memory order queue, whether one or more load instructions conflict with the store instruction.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a plurality of execution lanes to perform parallel execution of instructions;
    a scheduler to generate, in response to a determination that a received store instruction is to be executed by each of the plurality of execution lanes, a symbolic store address for the received store instruction based on an address of the received store instruction, wherein the symbolic store address is generated prior to computation of a lane store address for the received store instruction by each of the plurality of execution lanes; and
    a unified symbolic store address buffer coupled to the plurality of execution lanes, the unified symbolic store address buffer comprising a plurality of entries, wherein a first entry of the plurality of entries is to store the symbolic store address generated for the received store instruction.

2. The apparatus of claim 1, wherein the scheduler is to generate the symbolic store address based on at least some address fields of the received store instruction, the symbolic store address comprising a plurality of fields including a displacement field, a base register field, and an index register field.

3. The apparatus of claim 2, wherein the plurality of fields further includes a scale factor field and an operand size field.

4. The apparatus of claim 2, wherein the scheduler is, for a load instruction following the received store instruction in program order, to:
    generate a second symbolic load address for the load instruction based on at least some address fields of the load instruction;
    access the unified symbolic store address buffer based on the symbolic load address, to determine whether the load instruction conflicts with the received store instruction.

5. The apparatus of claim 4, wherein in response to a determination that the load instruction conflicts with the received store instruction, the scheduler is to suppress the load instruction until the received store instruction completes.

6. The apparatus of claim 4, wherein in response to a determination that the load instruction does not conflict with the received store instruction, the scheduler is to speculatively dispatch the load instruction to the plurality of execution lanes.

7. The apparatus of claim 6, wherein in response to the speculative dispatch of the load instruction, at least some of the plurality of execution lanes are to compute a lane load address for the load instruction, execute the load instruction and store the lane load address into a memory order queue of the execution lane.

8. The apparatus of claim 7, wherein at retirement of the received store instruction, each of the plurality of execution lanes is to compute a lane store address for the received store instruction and determine based at least in part on contents of the memory order queue whether one or more load instructions conflict with the received store instruction.

9. The apparatus of claim 8, wherein in response to a determination of the conflict in a first execution lane, the first execution lane is to flush the one or more load instructions from the first execution lane.

10. The apparatus of claim 1, wherein the apparatus is to dynamically disable speculative execution of load instructions based at least in part on a performance metric of an application in execution.

11. The apparatus of claim 10, wherein the performance metric comprises a mis-speculation rate.

12. A system comprising:
a processor comprising:
a host processor comprising a plurality of cores, wherein a first core is to execute a first thread; and
a data parallel cluster coupled to the host processor, the data parallel cluster comprising:
a plurality of execution lanes to perform parallel execution of instructions of a second thread related to the first thread;
a scheduler to generate, in response to a determination that a received store instruction is to be executed by each of the plurality of execution lanes, a symbolic store address for the received store instruction based on an address of the store instruction, wherein the symbolic store address is generated prior to computation of a lane store address for the received store instruction by each of the plurality of execution lanes; and
a unified symbolic store address buffer coupled to the plurality of execution lanes to store the symbolic store address; and
a system memory coupled to the processor.

13. The system of claim 12, wherein the scheduler is, for a load instruction following the received store instruction in program order, to generate a symbolic load address for the load instruction based on an address of the load instruction and access the unified symbolic store address buffer based on the symbolic load address to determine whether the load instruction conflicts with the received store instruction.

14. The system of claim 13, wherein in response to a determination that the received load instruction does not conflict with the in-flight store instruction, the plurality of execution lanes are to compute a lane load address for the load instruction, speculatively execute the load instruction and store the lane load address in a memory order queue of the execution lane, and at retirement of the received store instruction compute the lane store address for the received store instruction and determine, based at least in part on contents of the memory order queue, whether one or more load instructions conflict with the received store instruction.

* * * * *